US011927911B2

(12) United States Patent
Leemhuis et al.

(10) Patent No.: US 11,927,911 B2
(45) Date of Patent: Mar. 12, 2024

(54) REPLACEABLE UNIT FOR AN ELECTROPHOTOGRAPHIC IMAGE FORMING DEVICE HAVING A MOVABLE ELECTRICAL CONNECTOR

(71) Applicant: LEXMARK INTERNATIONAL, INC., Lexington, KY (US)

(72) Inventors: James Richard Leemhuis, Lexington, KY (US); Kyle Bradley Martin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 4 days.

(21) Appl. No.: 17/942,398

(22) Filed: Sep. 12, 2022

(65) Prior Publication Data

US 2023/0004116 A1 Jan. 5, 2023

Related U.S. Application Data

(63) Continuation of application No. 17/315,758, filed on May 10, 2021, now Pat. No. 11,500,325, which is a continuation of application No. 16/939,664, filed on Jul. 27, 2020, now Pat. No. 11,036,177, which is a (Continued)

(51) Int. Cl.

*G03G 21/16* (2006.01)
*G03G 15/00* (2006.01)
*G03G 21/18* (2006.01)

(52) U.S. Cl.

CPC ......... *G03G 21/1652* (2013.01); *G03G 15/80* (2013.01); *G03G 21/1821* (2013.01); *G03G 2221/1657* (2013.01)

(58) Field of Classification Search

CPC ....... G03G 2221/1657; G03G 21/1821; G03G 21/1652; G03G 15/80

See application file for complete search history.

(56) References Cited

U.S. PATENT DOCUMENTS

2014/0169808 A1* 6/2014 Leemhuis ............ G03G 15/086 399/27

OTHER PUBLICATIONS

Examination Report dated Jul. 26, 2023 for European Patent Application No. 21163372.2.

(Continued)

*Primary Examiner* — Victor Verbitsky
(74) *Attorney, Agent, or Firm* — Justin M. Tromp

(57) ABSTRACT

A replaceable unit for an electrophotographic image forming device includes a housing having a reservoir for holding toner. An electrical connector is positioned on a first side of the housing. The electrical connector includes an electrical contact for contacting a corresponding electrical contact in the image forming device. The electrical contact of the replaceable unit is electrically connected to processing circuitry mounted on the housing. The electrical connector is movable between a first position and a second position. The electrical contact of the replaceable unit moves outward from the first side of the housing along a side-to-side dimension of the housing when the electrical connector moves from the first position to the second position. The electrical contact of the replaceable unit faces downward when the electrical connector is in the second position permitting the corresponding electrical contact to contact the electrical contact of the replaceable unit from below.

19 Claims, 14 Drawing Sheets

Related U.S. Application Data continuation of application No. 16/382,759, filed on Apr. 12, 2019, now Pat. No. 10,761,476.

(56) References Cited

OTHER PUBLICATIONS

Examination Report dated Sep. 30, 2022 for European Patent Application No. 20168128.5.
Examination Report dated Oct. 5, 2023 for Canadian Patent Application No. 3136349.
Examination Report dated Oct. 5, 2023 for Canadian Patent Application No. 3136350.

* cited by examiner

REPLACEABLE UNIT FOR AN ELECTROPHOTOGRAPHIC IMAGE FORMING DEVICE HAVING A MOVABLE ELECTRICAL CONNECTOR

CROSS REFERENCES TO RELATED APPLICATIONS

This application is a continuation application of U.S. patent application Ser. No. 17/315,758, filed May 10, 2021, entitled "Replaceable Unit for an Electrophotographic Image Forming Device Having a Movable Electrical Connector," which is a continuation application of U.S. patent application Ser. No. 16/939,664, filed Jul. 27, 2020, now U.S. Pat. No. 11,036,177, issued Jun. 15, 2021, entitled "Replaceable Unit for an Electrophotographic Image Forming Device Having a Movable Electrical Connector," which is a continuation application of U.S. patent application Ser. No. 16/382,759, filed Apr. 12, 2019, now U.S. Pat. No. 10,761,476, issued Sep. 1, 2020, entitled "Replaceable Unit for an Electrophotographic Image Forming Device Having a Movable Electrical Connector."

BACKGROUND

1. Field of the Disclosure

The present disclosure relates generally to image forming devices and more particularly to a replaceable unit for an electrophotographic image forming device having a movable electrical connector.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units that have a shorter lifespan than the image forming device. It is desired to communicate various operating parameters and usage information of the replaceable unit(s) to the image forming device for proper operation. For example, it may be desired to communicate such information as replaceable unit serial number, replaceable unit type, toner color, toner capacity, amount of toner remaining, license information, etc. The replaceable unit(s) typically include processing circuitry configured to communicate with and respond to commands from a controller in the image forming device. The replaceable unit(s) also include memory associated with the processing circuitry that stores program instructions and information related to the replaceable unit. The processing circuitry and associated memory are typically mounted on a circuit board that is attached to the replaceable unit. The replaceable unit also includes one or more electrical contacts that mate with corresponding electrical contacts in the image forming device upon installation of the replaceable unit in the image forming device in order to facilitate communication between the processing circuitry of the replaceable unit and the controller of the image forming device. It is important to accurately position the electrical contacts of the replaceable unit relative to the corresponding electrical contacts of the image forming device in order to ensure a reliable connection between the processing circuitry of the replaceable unit and the controller of the image forming device when the replaceable unit is installed in the image forming device. Accordingly, positioning features that provide precise alignment of the electrical contacts of the replaceable unit with corresponding electrical contacts of the image forming device are desired.

SUMMARY

A replaceable unit for an electrophotographic image forming device according to one example embodiment includes a housing having a top, a bottom, a front and a rear positioned between a first side and a second side of the housing. The housing has a reservoir for holding toner. An electrical connector is positioned on the first side of the housing. The electrical connector includes an electrical contact for contacting a corresponding electrical contact in the image forming device. The electrical contact of the replaceable unit is electrically connected to processing circuitry mounted on the housing. The electrical connector is movable between a first position and a second position. The electrical contact of the replaceable unit moves outward from the first side of the housing along a side-to-side dimension of the housing when the electrical connector moves from the first position to the second position such that the electrical contact of the replaceable unit is positioned further outward along the side-to-side dimension of the housing when the electrical connector is in the second position than when the electrical connector is in the first position. The electrical contact of the replaceable unit faces downward and is unobstructed from below when the electrical connector is in the second position permitting the corresponding electrical contact in the image forming device to contact the electrical contact of the replaceable unit from below.

Embodiments include those wherein the electrical connector is pivotable about a pivot axis between the first position and the second position. The electrical contact of the replaceable unit pivots outward from the first side of the housing when the electrical connector pivots from the first position to the second position. In some embodiments, a position of the pivot axis is fixed relative to the housing. In some embodiments, the pivot axis extends in a direction from the rear of the housing to the front of the housing and angles downward in the direction from the rear of the housing to the front of the housing. In some embodiments, the electrical contact of the replaceable unit pivots upward when the electrical connector pivots from the first position to the second position.

Some embodiments include a developer roll rotatably positioned on the housing. A portion of an outer surface of the developer roll is exposed along the front of the housing for supplying toner from the reservoir to a corresponding photoconductive drum.

Some embodiments include an interface gear on the second side of the housing. At least a portion of the interface gear is exposed on the front of the housing for mating with a corresponding drive gear and receiving rotational force from the corresponding drive gear.

Some embodiments include a biasing member that biases the electrical connector toward the first position.

Embodiments include those wherein when the electrical connector is in the second position, the electrical contact of the replaceable unit is positioned closer to the bottom of the housing than to the top of the housing and the electrical contact of the replaceable unit is positioned closer to the rear of the housing than to the front of the housing.

Embodiments include those wherein the electrical contact of the replaceable unit faces inward toward the first side of the housing when the electrical connector is in the first position.

Embodiments include those wherein the electrical connector includes a printed circuit board that includes the processing circuitry. The electrical contact of the replaceable unit is positioned on a face of the printed circuit board. The face of the printed circuit board faces downward when the electrical connector is in the second position and the face of the printed circuit board faces inward toward the first side of the housing when the electrical connector is in the first position.

Embodiments include those wherein the electrical connector includes a cam surface that is positioned along a distal end of the electrical connector relative to the first side of the housing for contacting an actuation member during installation of the replaceable unit to move the electrical connector from the first position to the second position. In some embodiments, the cam surface extends toward the front of the housing from a front portion of the electrical connector; a bottom portion of the cam surface faces downward when the electrical connector is in the second position; and the bottom portion of the cam surface angles upward in a direction from the rear of the housing to the front of the housing when the electrical connector is in the second position. In some embodiments, the cam surface extends toward the front of the housing from a front portion of the electrical connector; an outer side portion of the cam surface faces outward away from the first side of the housing when the electrical connector is in the second position; and the outer side portion of the cam surface angles inward toward the first side of the housing in a direction from the rear of the housing to the front of the housing when the electrical connector is in the second position.

A replaceable unit for an electrophotographic image forming device according to another example embodiment includes a housing having a top, a bottom, a front and a rear positioned between a first side and a second side of the housing. The housing has a reservoir for holding toner. An outlet in fluid communication with the reservoir is positioned on the front of the housing for exiting toner from the replaceable unit. An electrical connector is positioned on the first side of the housing. The electrical connector includes an electrical contact for contacting a corresponding electrical contact in the image forming device. The electrical contact of the replaceable unit is electrically connected to processing circuitry mounted on the housing. The electrical connector is pivotable about a pivot axis between a retracted position and an operative position. The electrical connector and the electrical contact of the replaceable unit pivot outward from the first side of the housing when the electrical connector pivots from the retracted position to the operative position. The electrical contact of the replaceable unit faces downward and is unobstructed from below when the electrical connector is in the operative position permitting the corresponding electrical contact in the image forming device to contact the electrical contact of the replaceable unit from below.

BRIEF DESCRIPTION OF THE DRAWINGS

The accompanying drawings incorporated in and forming a part of the specification illustrate several aspects of the present disclosure and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
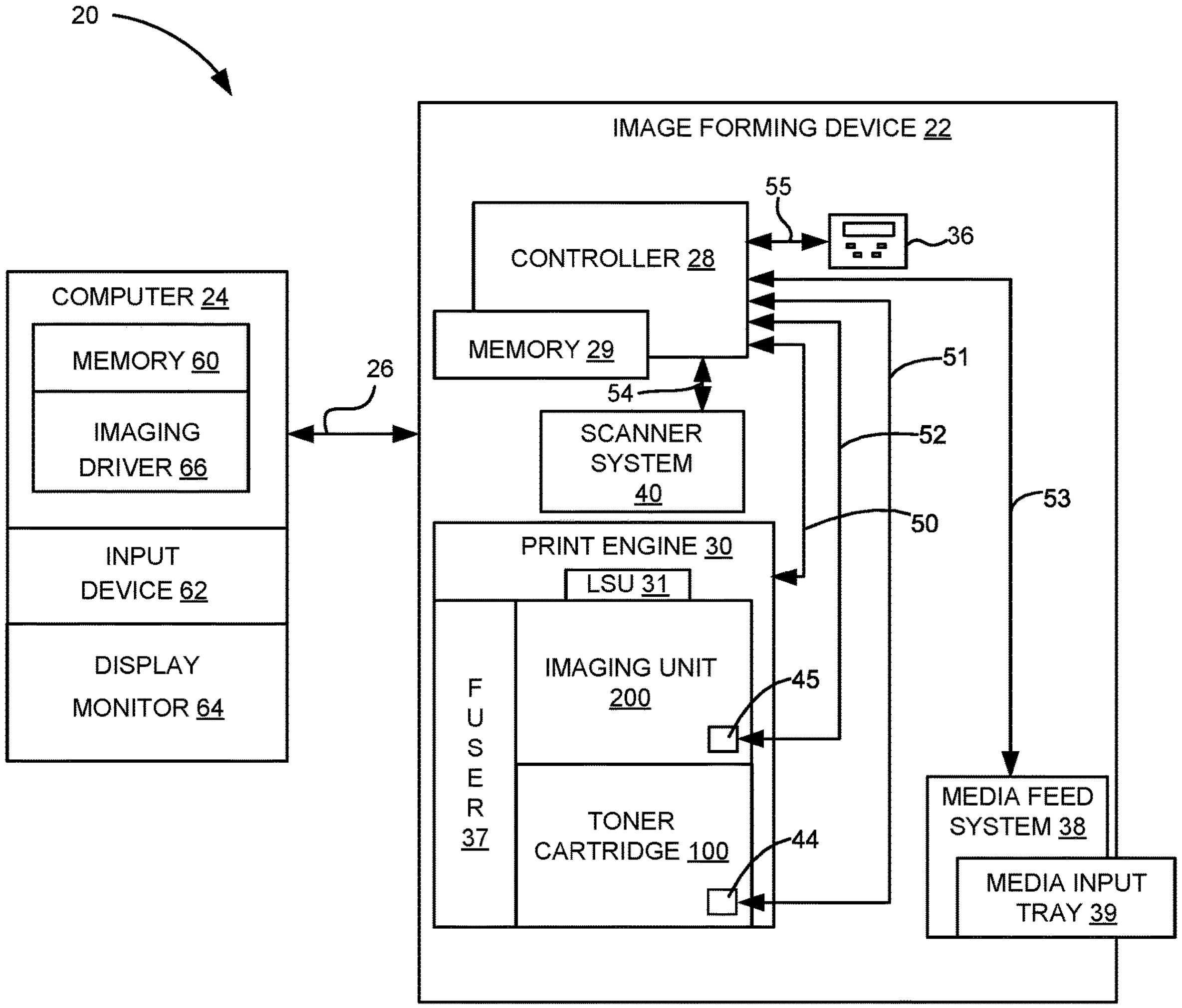
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, a toner cartridge 100, an imaging unit 200, a user interface 36, a media feed system 38, a media input tray 39 and a scanner system 40. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor unit may include one or more integrated circuits in the form of a microprocessor or central processing unit and may include one or more Application-Specific Integrated Circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with toner cartridge 100 and processing circuitry 44 thereon via a communications link 51. Controller 28 communicates with imaging unit 200 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 processes print and scan data and operates print engine 30 during printing and scanner system 40 during scanning. Processing circuitry 44, 45 may provide authentication functions, safety and operational interlocks, operating parameters and usage information related to toner cartridge 100 and imaging unit 200, respectively. Each of processing circuitry 44, 45 includes a processor unit and associated electronic memory. As discussed above, the processor may include one or more integrated circuits in the form of a microprocessor or central processing unit and/or may include one or more Application-Specific Integrated Circuits (ASICs). The memory may be any volatile or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100, imaging unit 200 and a fuser 37, all mounted within image forming device 22. Toner cartridge 100 and imaging unit 200 are removably mounted in image forming device 22. In one embodiment, toner cartridge 100 includes a developer unit that houses a toner reservoir and a toner development system. In one embodiment, the toner development system utilizes what is commonly referred to as a single component development system. In this embodiment, the toner development system includes a toner adder roll that provides toner from the toner reservoir to a developer roll. A doctor blade provides a metered, uniform layer of toner on the surface of the developer roll. In another embodiment, the toner development system utilizes what is commonly referred to as a dual component development system. In this embodiment, toner in the toner reservoir of the developer unit is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, the developer unit includes a developer roll that attracts the magnetic carrier beads having toner thereon to the developer roll through the use of magnetic fields. In one embodiment, imaging unit 200 includes a photoconductor unit that houses a charge roll, a photoconductive drum and a waste toner removal system. Although the example image forming device 22 illustrated in FIG. 1 includes one toner cartridge and imaging unit, in the case of an image forming device configured to print in color, separate toner cartridges and imaging units may be used for each toner color. For example, in one embodiment, the image forming device includes four toner cartridges, each containing a particular toner color (e.g., black, cyan, yellow and magenta) to permit color printing, and four corresponding imaging units.

The electrophotographic printing process is well known in the art and, therefore, is described briefly herein. During a printing operation, laser scan unit 31 creates a latent image on the photoconductive drum in imaging unit 200. Toner is transferred from the toner reservoir in toner cartridge 100 to the latent image on the photoconductive drum by the developer roll to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
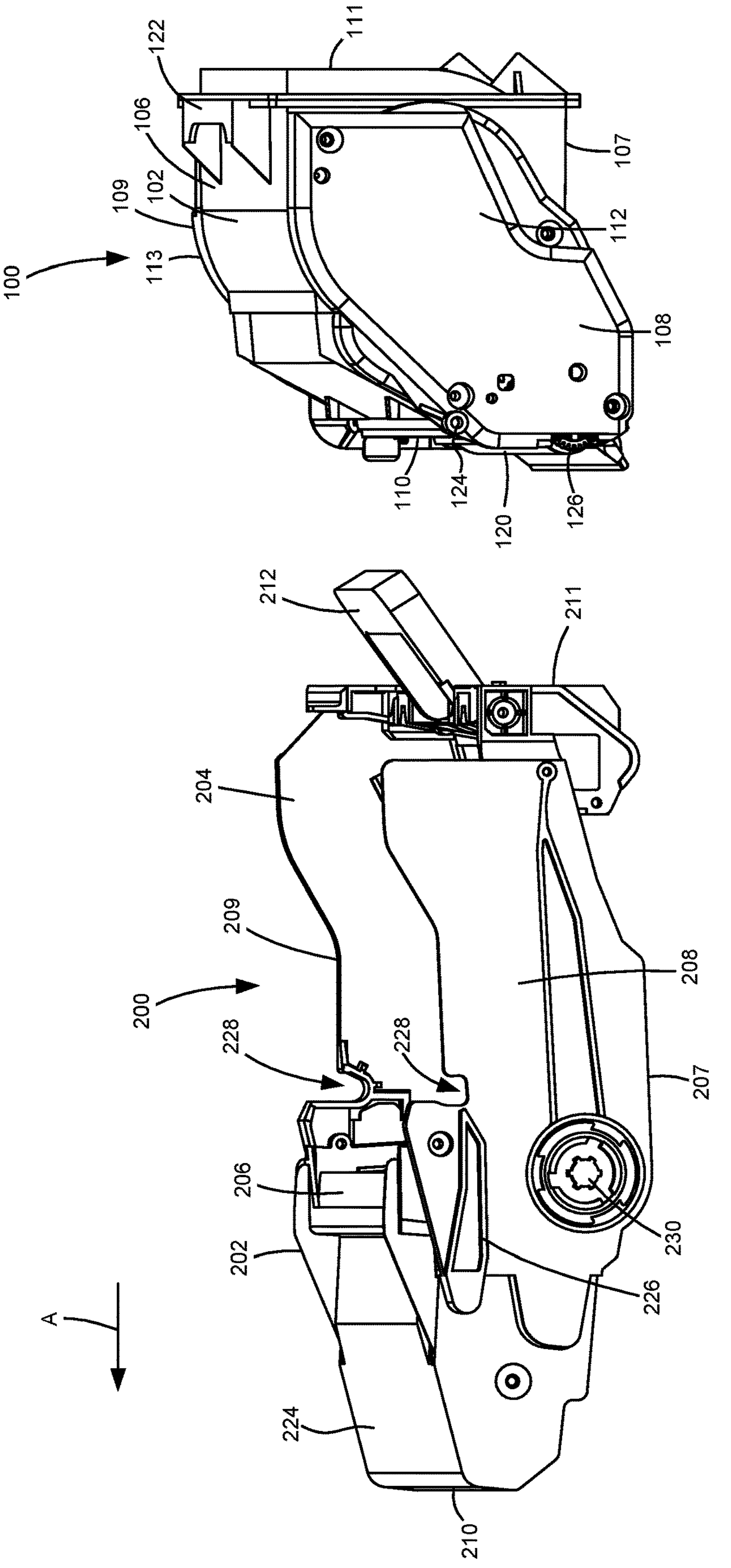
FIG. 2 is a perspective view of a toner cartridge and an imaging unit according to one example embodiment.

Referring now to FIG. 2, toner cartridge 100 and imaging unit 200 are shown according to one example embodiment. As discussed above, toner cartridge 100 and imaging unit 200 are each removably installed in image forming device 22. Toner cartridge 100 is first installed on a frame 204 of imaging unit 200 and mated with imaging unit 200. Toner cartridge 100 and imaging unit 200 are then slidably inserted together into image forming device 22. The arrow A shown in FIG. 2 indicates the direction of insertion of toner cartridge 100 and imaging unit 200 into image forming device 22. This arrangement allows toner cartridge 100 and imaging unit 200 to be easily removed from and reinstalled in image forming device 22 as a single unit, while permitting toner cartridge 100 and imaging unit 200 to be repaired or replaced separately from each other.

Figure 3:
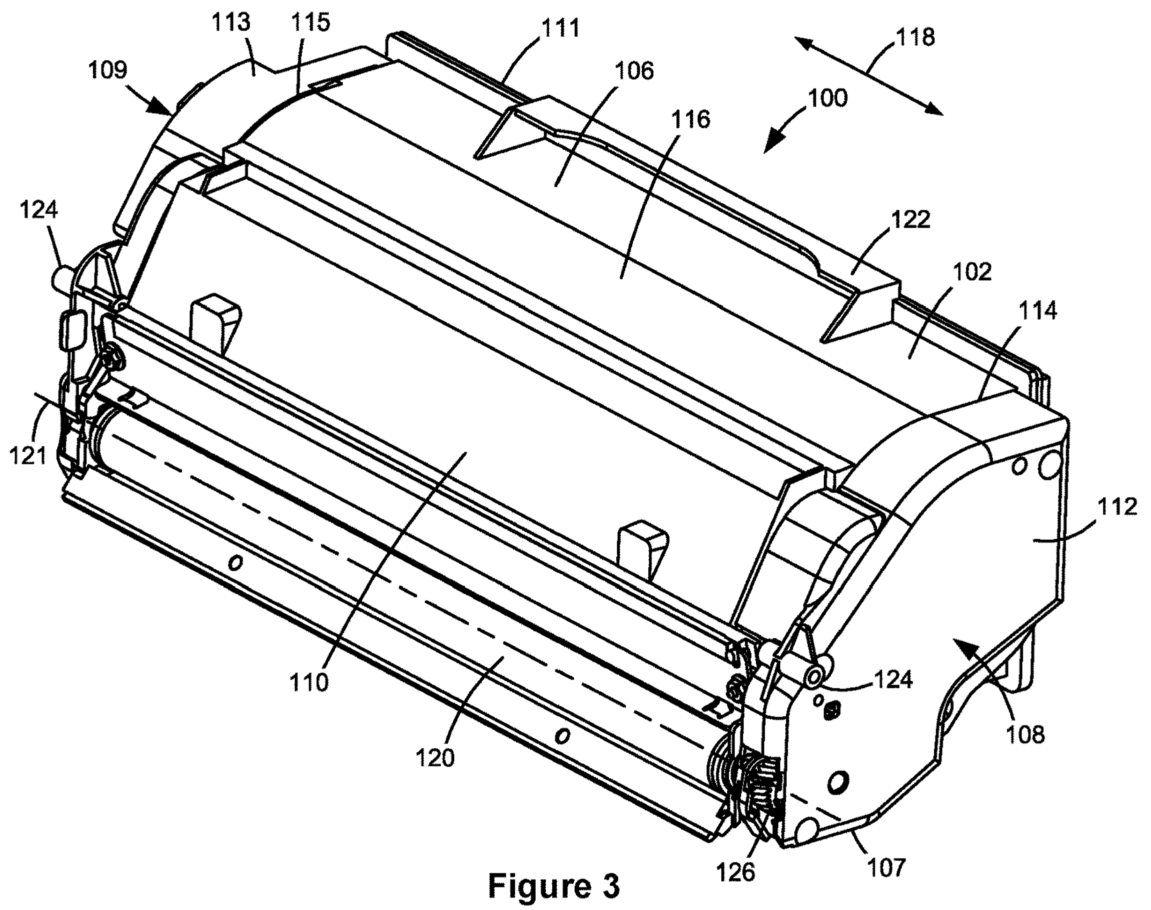
FIG. 3 is a front perspective view of the toner cartridge shown in FIG. 2.
Figure 4:
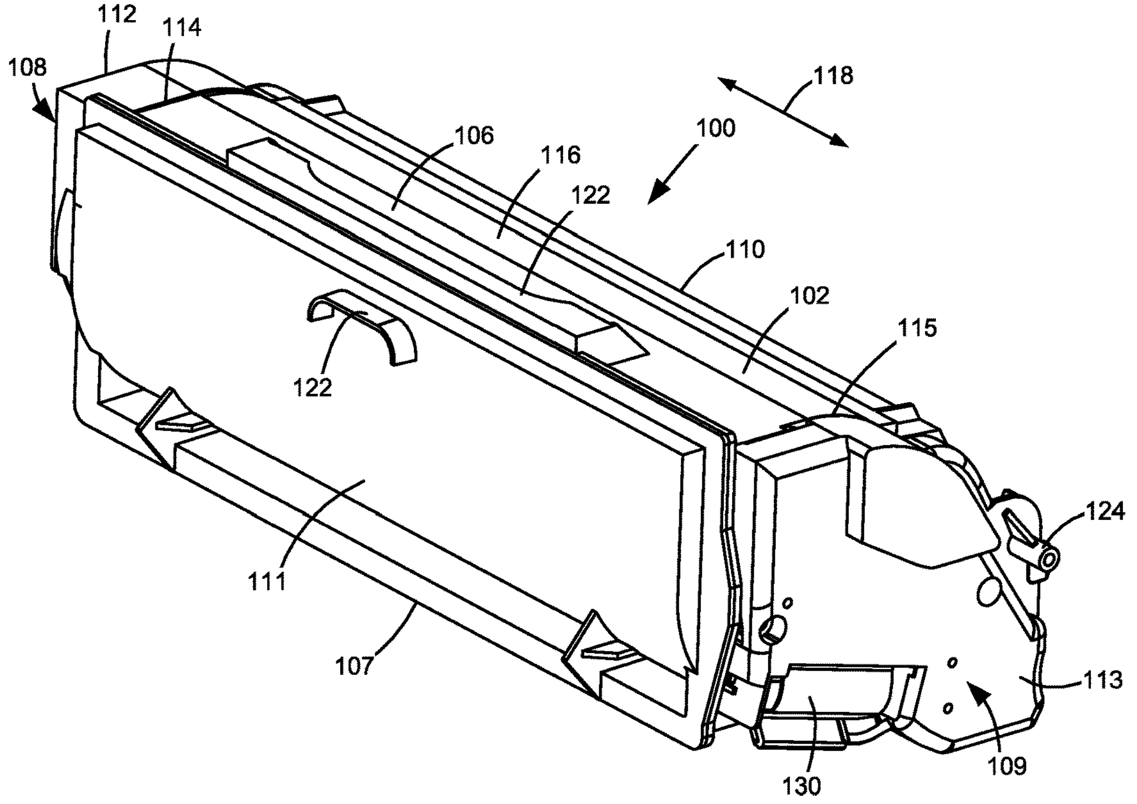
FIG. 4 is a rear perspective view of the toner cartridge shown in FIGS. 2 and 3.

With reference to FIGS. 2-4, toner cartridge 100 includes a housing 102 having an enclosed reservoir 104 (FIGS. 17A and 17B) for storing toner. Housing 102 includes a top 106, a bottom 107, first and second sides 108, 109, a front 110 and a rear 111. Front 110 of housing 102 leads during insertion of toner cartridge 100 into image forming device 22 and rear 111 trails. In one embodiment, each side 108, 109 of housing 102 includes an end cap 112, 113 mounted, e.g., by fasteners or a snap-fit engagement, to side walls 114, 115 of a main body 116 of housing 102. In the example embodiment illustrated, toner cartridge 100 includes a rotatable developer roll 120 having a rotational axis 121 that runs along a side-to-side dimension 118 of housing 102, from side 108 to side 109. A portion of developer roll 120 is exposed from housing 102 along front 110 of housing 102, near bottom 107 of housing 102 for delivering toner from toner cartridge 100 to a corresponding photoconductive drum of imaging unit 200. In this manner, developer roll 120 forms an outlet for exiting toner from toner cartridge 100. A handle 122 may be provided on top 106 or rear 111 of housing 102 to assist with coupling and decoupling toner cartridge 100 to and from imaging unit 200 and insertion and removal of toner cartridge 100 and imaging unit 200 into and out of image forming device 22.

Sides 108, 109 may each include one or more alignment guides 124 that extend outward from the respective side 108, 109 to assist with mating toner cartridge 100 to imaging unit 200. Alignment guides 124 are received by corresponding guide rails on imaging unit 200 that aid in positioning toner cartridge 100 relative to imaging unit 200. In the example embodiment illustrated, an alignment guide 124 is positioned on an outer side of each end cap 112, 113.

Toner cartridge 100 also includes a drive gear 126 positioned on side 108 of housing 102. In the embodiment illustrated, drive gear 126 mates with and receives rotational force from a corresponding drive gear on imaging unit 200 in order to provide rotational force to developer roll 120 and other rotatable components of toner cartridge 100 for moving toner to developer roll 120 when toner cartridge 100 is installed in image forming device 22. In the embodiment illustrated, drive gear 126 is mounted to a shaft of developer roll 120, coaxial with developer roll 120. In this embodiment, a front portion of drive gear 126 is exposed on the front 110 of housing 102, near bottom 107 of housing 102 and is unobstructed to mate with and receive rotational force from the corresponding drive gear on imaging unit 200. In the embodiment illustrated, drive gear 126 is rotatably connected to a drive train that is positioned between end cap 112 and side wall 114 of housing 102. The drive train aids in transferring rotational force from drive gear 126 to rotatable components of toner cartridge 100, including, for example, to a toner adder roll that provides toner from reservoir 104 to developer roll 120 and to one or more toner agitators that move toner in reservoir 104 toward the toner adder roll and that agitate and mix the toner in reservoir 104. In the example embodiment illustrated, drive gear 126 is formed as a helical gear, but other configurations may be used as desired.

Toner cartridge 100 also includes an electrical connector 130 positioned on side 109 of housing 102 that includes one or more electrical contacts 132 (FIG. 8) that mate with corresponding electrical contacts in image forming device 22 when toner cartridge 100 is installed in image forming device 22 in order to facilitate communications link 51 between controller 28 of image forming device 22 and processing circuitry 44 of toner cartridge 100 as discussed in greater detail below.

Figure 5:
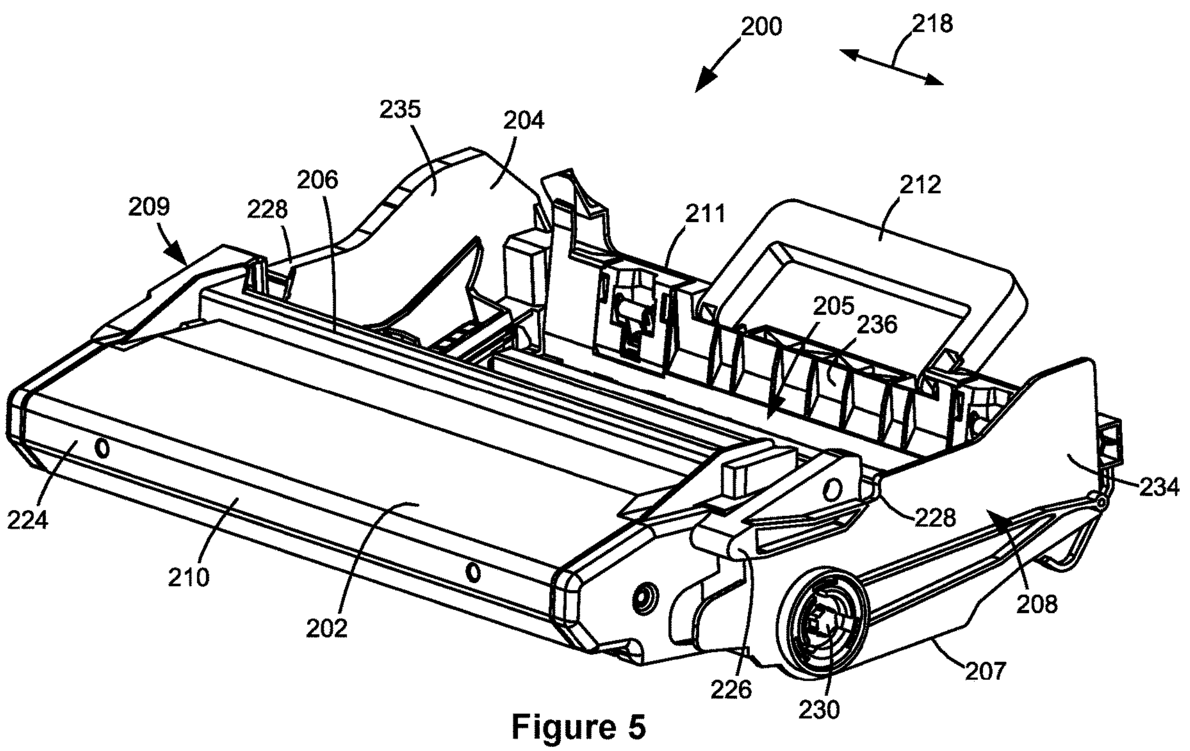
FIG. 5 is a front perspective view of the imaging unit shown in FIG. 2.
Figure 6:
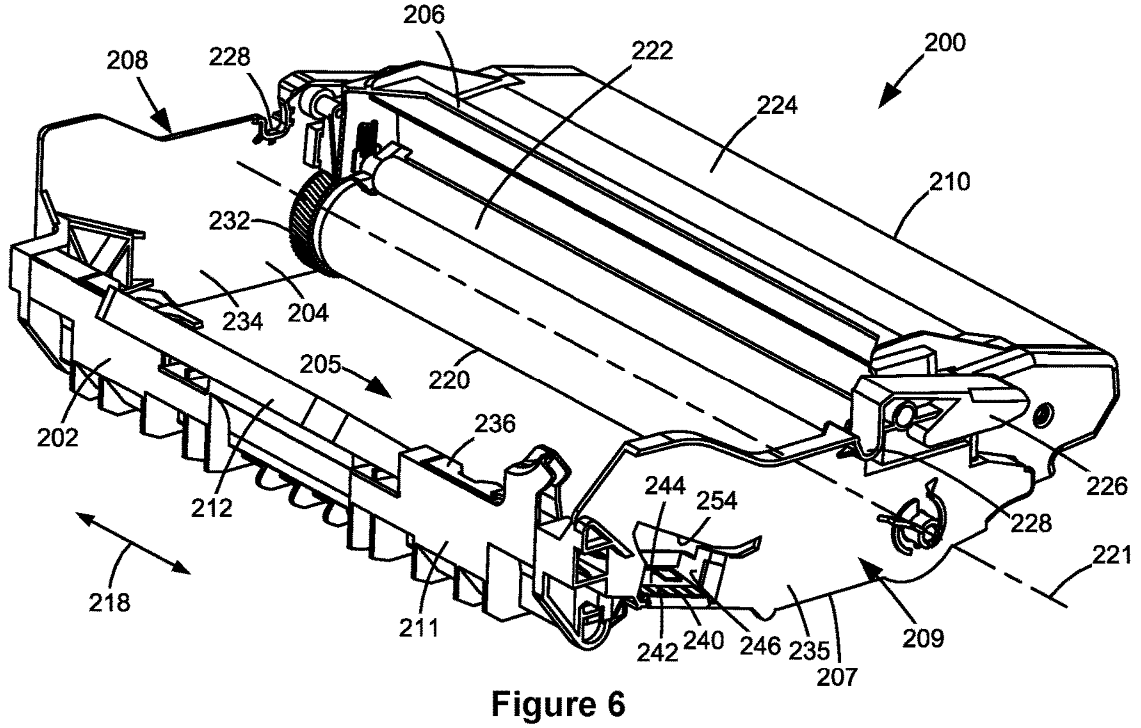
FIG. 6 is a rear perspective view of the imaging unit shown in FIGS. 2 and 5.

With reference to FIGS. 2, 5 and 6, imaging unit 200 includes a housing 202 including a top 206, a bottom 207, first and second sides 208, 209, a front 210 and a rear 211. Front 210 of housing 202 leads during insertion of imaging unit 200 into image forming device 22 and rear 211 trails. In the embodiment illustrated, frame 204 includes a toner cartridge receiving area 205 positioned at rear 211 of housing 202. A handle 212 may be provided on rear 211 of housing 202, e.g., on frame 204, to assist with insertion and removal of toner cartridge 100 and imaging unit 200 into and out of image forming device 22.

In the example embodiment illustrated, imaging unit 200 includes a rotatable photoconductive drum 220 having a rotational axis 221 that runs along a side-to-side dimension 218 of housing 202, from side 208 to side 209. A rear portion of photoconductive drum 220 is open to toner cartridge receiving area 205 of frame 204 for receiving toner from developer roll 120 of toner cartridge 100. A bottom portion of photoconductive drum 220 is exposed from housing 202 on bottom 207 of housing 202. Toner on the outer surface of photoconductive drum 220 is transferred from the bottom portion of the outer surface of photoconductive drum 220 to a media sheet or intermediate transfer member during a print operation. Imaging unit 200 also includes a rotatable charge roll 222 in contact with the outer surface of photoconductive drum 220 that charges the outer surface of photoconductive drum 220 to a predetermined voltage. Imaging unit 200 also includes a waste toner removal system that may include a cleaner blade or roll that removes residual toner from the outer surface of photoconductive drum 220. In the example embodiment illustrated, imaging unit 200 includes a waste toner reservoir 224 positioned at the front 210 of housing 202. Waste toner reservoir 224 stores toner removed from photoconductive drum 220 by the cleaner blade or roll.

Sides 208, 209 may each include one or more alignment guides 226 that extend outward from the respective side 208, 209 to assist with insertion and removal of toner cartridge 100 and imaging unit 200 into and out of image forming device 22. Alignment guides 226 are received by corresponding guide rails in image forming device 22 that aid in positioning toner cartridge 100 and imaging unit 200 relative to image forming device 22. Sides 208, 209 of frame 204 may each include a guide rail 228 that receives a corresponding alignment guide 124 of toner cartridge 100 to aid in positioning toner cartridge 100 relative to imaging unit 200.

Imaging unit 200 also includes a drive coupler 230 positioned on side 208 of housing 202. Drive coupler 230 mates with and receives rotational force from a corresponding drive coupler in image forming device 22 in order to provide rotational force to photoconductive drum 220 when imaging unit 200 is installed in image forming device 22. In the embodiment illustrated, drive coupler 230 is positioned at an axial end of photoconductive drum 220, coaxial with photoconductive drum 220. In this embodiment, an outer axial end of drive coupler 230 is exposed on side 208 of housing 202 and is unobstructed to mate with and receive rotational force from the corresponding drive coupler in image forming device 22. In the example embodiment illustrated, drive coupler 230 is configured to receive rotational force at the outer axial end of drive coupler 230, but other configurations may be used as desired. In some embodiments, charge roll 222 is driven by friction contact between the surfaces of charge roll 222 and photoconductive drum 220. In other embodiments, charge roll 222 is connected to drive coupler 230 by one or more gears.

In the embodiment illustrated, imaging unit 200 also includes a drive gear 232 attached to photoconductive drum 220, axially inboard of drive coupler 230. A portion of drive gear 232 is exposed to toner cartridge receiving area 205 of frame 204 permitting drive gear 126 of toner cartridge 100 to mate with drive gear 232 of imaging unit 200 when toner cartridge 100 is installed on frame 204 of imaging unit 200 to permit the transfer of rotational force received by drive coupler 230 of imaging unit 200 to drive gear 126 of toner cartridge 100 by way of drive gear 232 of imaging unit 200.

Imaging unit 200 also includes an electrical connector 240 positioned on a portion of frame 204 on side 209 of housing 202 that includes one or more electrical contacts 242 that mate with corresponding electrical contacts in image forming device 22 when imaging unit 200 is installed in image forming device 22 in order to facilitate communications link 52 between controller 28 of image forming device 22 and processing circuitry 45 of imaging unit 200 as discussed in greater detail below.

Figure 7:
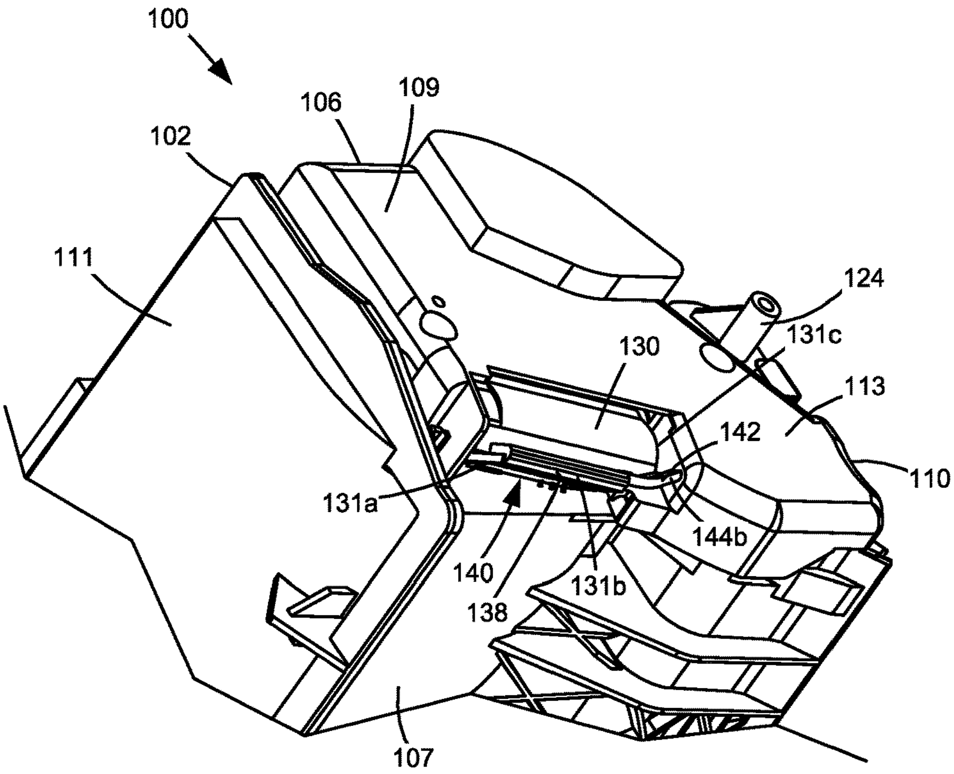
FIG. 7 is a perspective view showing an electrical connector of the toner cartridge in a retracted position according to one example embodiment.
Figure 8:
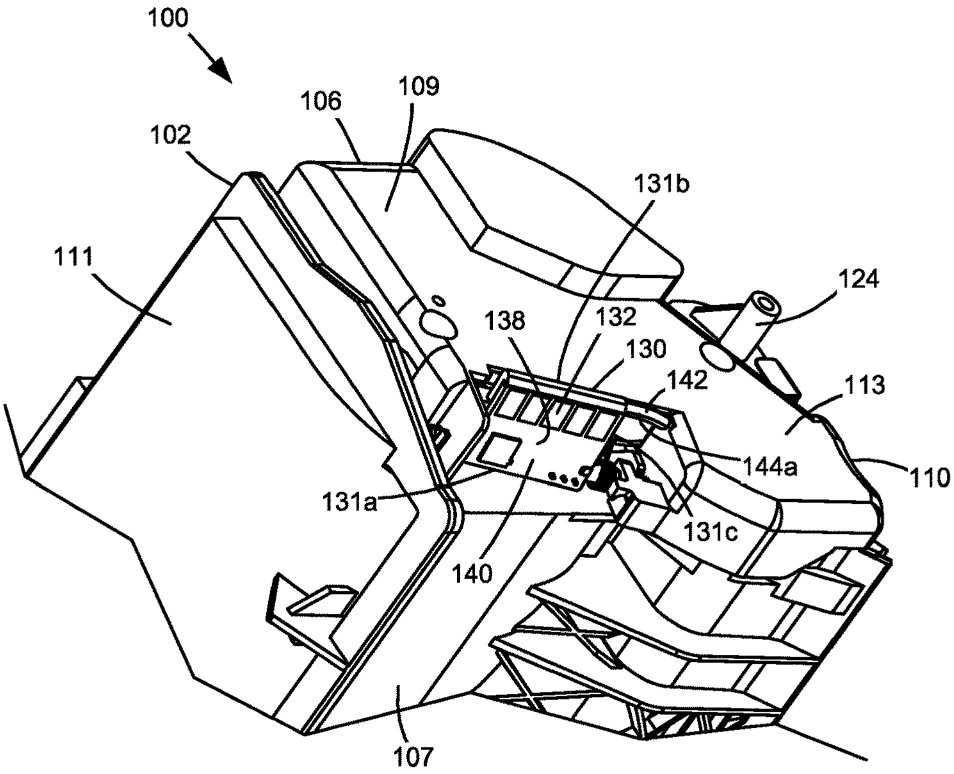
FIG. 8 is a perspective view showing the electrical connector of the toner cartridge in an operative position according to one example embodiment.
Figure 9:
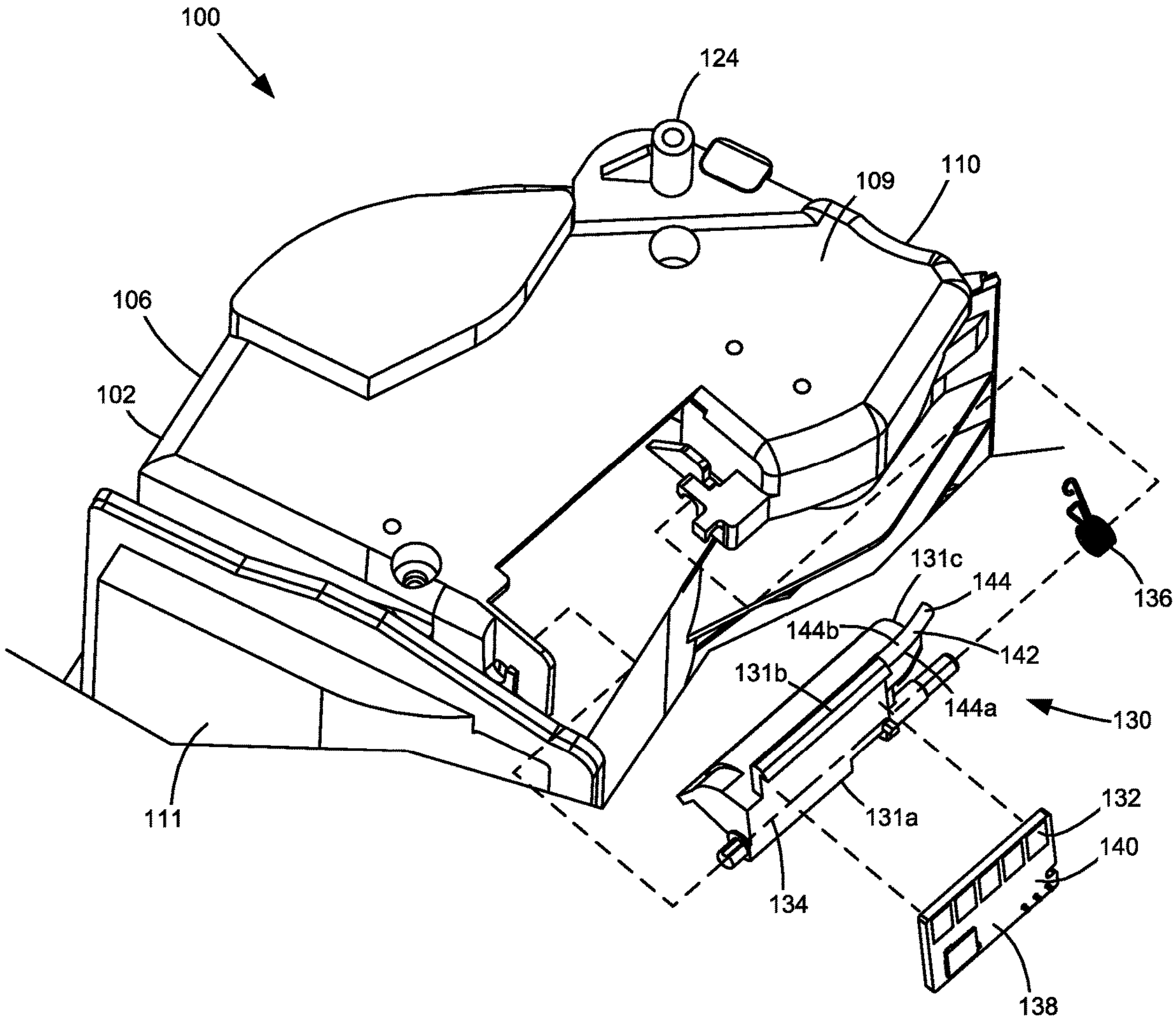
FIG. 9 is an exploded view of the electrical connector of the toner cartridge according to one example embodiment.

FIGS. 7-9 show electrical connector 130 of toner cartridge 100 in greater detail. In the example embodiment illustrated, electrical connector 130 is positioned on side 109 of housing, near bottom 107 and rear 111 of housing 102. Electrical connector 130 is movably connected to housing 102 such that electrical connector 130 is movable relative to housing 102 between a retracted or home position shown in FIG. 7 and an operative position shown in FIG. 8. In the example embodiment illustrated, electrical connector 130 is pivotable about a pivot axis 134 relative to housing 102 between the retracted position and the operative position. In the example embodiment illustrated, pivot axis 134 extends in a direction from rear 111 to front 110 and angles downward from rear 111 to front 110, but pivot axis 134 may take other orientations as desired. In the example embodiment illustrated, pivot axis 134 is positioned along a proximal end 131*a* of electrical connector 130 relative to side 109 of housing 102 and reservoir 104 along side-to-side dimension 118 of housing 102. In some embodiments, electrical connector 130 is biased toward the retracted position by a biasing member 136. In the example embodiment illustrated, biasing member 136 includes a torsion spring; however, any suitable biasing member 136 may be used as desired, such as, for example, one or more compression springs, extension springs, leaf springs or a material having resilient properties.

In the embodiment illustrated, electrical connector 130 includes a printed circuit board 138 having electrical contacts 132 and processing circuitry 44 positioned thereon. Printed circuit board 138 may be attached by a suitable fastener or adhesive as desired. Electrical contacts 132 are positioned on a face 140 of printed circuit board 138. In the example embodiment illustrated, in the retracted position of electrical connector 130 shown in FIG. 7, face 140 of printed circuit board 138 including electrical contacts 132 faces downward, toward bottom 107 of housing 102, and inward, toward side 109 of housing 102. In addition to facing downward and inward, in the embodiment illustrated, face 140 of printed circuit board 138 including electrical contacts 132 also faces rearward, toward rear 111 of housing 102, when electrical connector is in its retracted position due to the angle of pivot axis 134. In the operative position of electrical connector 130 shown in FIG. 8, face 140 of printed circuit board 138 including electrical contacts 132 faces downward, toward bottom 107 of housing 102, such as, for example, primarily downward. In addition to facing downward, in the embodiment illustrated, face 140 of printed circuit board 138 including electrical contacts 132 also faces rearward, toward rear 111 of housing 102, due to the angle of pivot axis 134 and slightly outward, away from side 109 of housing 102, when electrical connector is in its operative position. Electrical contacts 132 are positioned along a distal end 131*b* of electrical connector 130 relative to side 109 of housing 102 and reservoir 104 along side-to-side dimension 118 of housing 102, which also forms a free end of electrical connector 130 relative to pivot axis 134 in the embodiment illustrated, when electrical connector 130 is in its operative position.

Accordingly, in this embodiment, when electrical connector 130 moves from its retracted position to its operative position, electrical connector 130 pivots upward relative to housing 102 about pivot axis 134 with face 140 of printed circuit board 138 including electrical contacts 132 swinging upward and outward, away from side 109, about pivot axis 134. This movement is reversed when electrical connector 130 moves from its operative position to its retracted position wherein electrical connector 130 pivots downward relative to housing 102 about pivot axis 134 with face 140 of printed circuit board 138 including electrical contacts 132 swinging downward and inward, toward side 109, about pivot axis 134. In the example embodiment illustrated, when electrical connector 130 is in its operative position with face 140 of printed circuit board 138 facing downward, electrical contacts 132 are exposed from housing 102 and unobstructed from below permitting corresponding electrical contacts in image forming device 22 to contact and mate with electrical contacts 132 of electrical connector 130 from below. In this embodiment, when electrical connector 130 is in its retracted position with printed circuit board 138 swung downward and inward, toward side 109, electrical contacts 132 are partially hidden from view in order to help protect electrical contacts 132 and printed circuit board 138 from contamination, electrostatic discharge and physical damage.

Electrical connector 130 includes an actuation member 142 that is positioned to receive a force to overcome the bias applied to electrical connector 130 by biasing member 136 in order to move electrical connector 130 from its retracted position to its operative position. In the embodiment illustrated, actuation member 142 includes a cam surface 144 along distal end 131*b* of electrical connector 130 that extends forward, toward front 110 of housing 102, from a front end 131*c* of electrical connector 130 that is proximate to front 110 of housing 102. Cam surface 144 includes a bottom portion 144*a* that faces downward, toward bottom 107 of housing 102, when electrical connector 130 is in its operative position and an outer side portion 144*b* that faces outward, away from side 109 of housing 102, when electrical connector 130 is in its operative position. In the embodiment illustrated, bottom portion 144*a* of cam surface 144 angles upward relative to face 140 of printed circuit board 138, away from face 140 of printed circuit board 138 and electrical contacts 132, in a direction from rear 111 to front 110 of housing 102 and outer side portion 144*b* of cam surface 144 angles inward, toward pivot axis 134, in a direction from rear 111 to front 110 of housing 102.

While the example embodiment illustrated includes electrical contacts 132 positioned on printed circuit board 138 having processing circuitry 44, in other embodiments, printed circuit board 138 having processing circuitry 44 is positioned elsewhere on housing 102 and electrical contacts 132 are disposed on electrical connector 130 in the positions illustrated and are connected to processing circuitry 44 by suitable traces, wires or the like.

Figure 10:
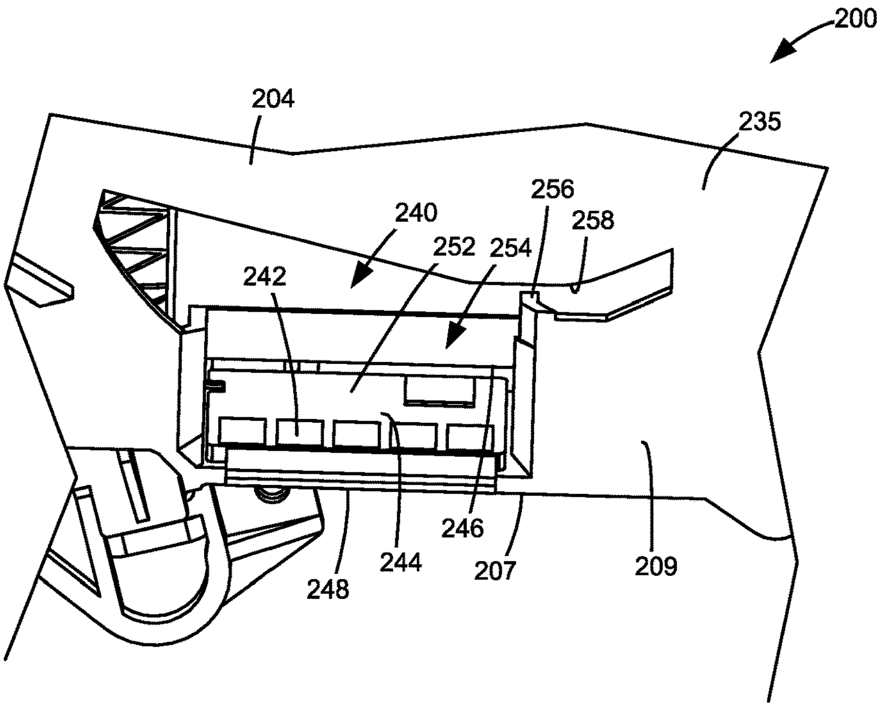
FIG. 10 is a side perspective view showing an electrical connector of the imaging unit according to one example embodiment.
Figure 11:
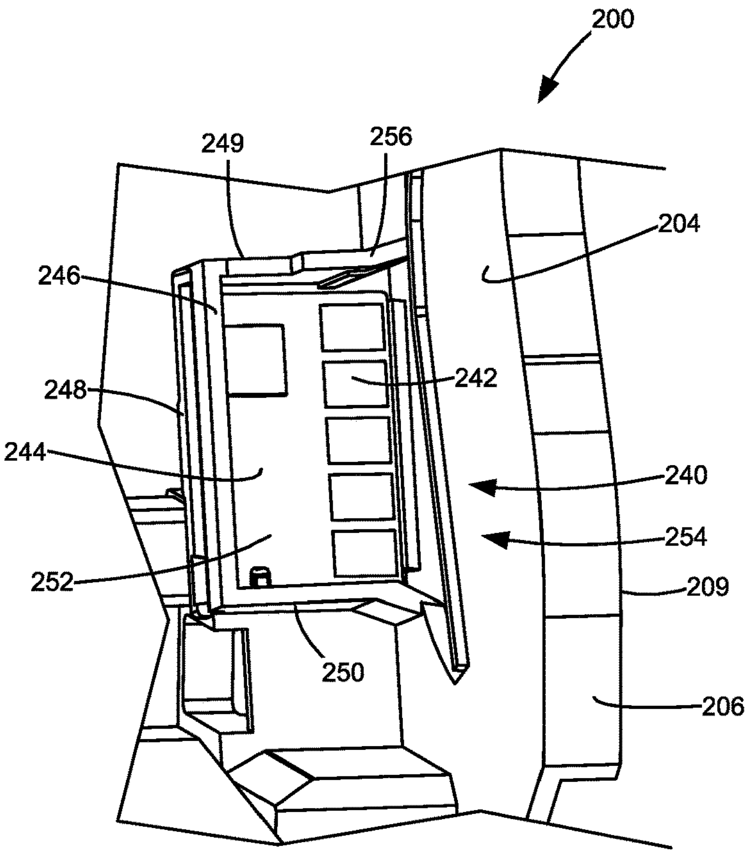
FIG. 11 is a top perspective view showing the electrical connector of the imaging unit according to one example embodiment.

FIGS. 10 and 11 show electrical connector 240 of imaging unit 200 in greater detail. In this embodiment, frame 204 of imaging unit 200 includes a side wall 234 on side 208 of housing 202, a side wall 235 on side 209 of housing 202 and a rear wall 236 on rear 211 of housing 202 (FIGS. 5 and 6). In this embodiment, electrical connector 240 includes a printed circuit board 244 positioned on a mount 246 on side wall 235 of frame 204. Printed circuit board 244 may be attached by a suitable fastener or adhesive as desired. Processing circuitry 45 of imaging unit 200 is positioned on printed circuit board 244. Mount 246 includes a bottom surface 248 and a front wall 249 and a rear wall 250 that extend upward from bottom surface 248 and along side-to-side dimension 218. In the embodiment illustrated, printed circuit board 244 is positioned on bottom surface 248 of mount 246 between front wall 249 and rear wall 250 of mount 246. In this embodiment, electrical contacts 242 are positioned on a top face 252 of printed circuit board 244 such that electrical contacts 242 face upward, toward top 206 of housing 202. Printed circuit board 244 and mount 246 are positioned adjacent to an opening 254 that extends through side wall 235 of frame 204 at an outer side of mount 246 and that permits corresponding electrical contacts in image forming device 22 to access and mate with electrical contacts 242 of electrical connector 240 of imaging unit 200 and electrical contacts 132 of electrical connector 130 of toner cartridge 100 from side 209 of housing 202 of imaging unit 200 and side 109 of housing 102 of toner cartridge 100 as discussed in greater detail below.

In the embodiment illustrated, front wall 249 of mount 246 includes an actuation member such as a cam surface 256 on a top edge of front wall 249 that contacts cam surface 144 of electrical connector 130 of toner cartridge 100 when toner cartridge 100 is installed on frame 204 of imaging unit 200 in order to move electrical connector 130 of toner cartridge 100 from its retracted position to its operative position as discussed in greater detail below. In this embodiment, cam surface 256 angles upward in a direction from side 208 to side 209 of housing 202. In the embodiment illustrated, an upstop 258 is spaced above cam surface 256 along a top edge of opening 254. Upstop 258 is positioned to limit the travel of electrical connector 130 of toner cartridge 100 from its retracted position to its operative position as discussed in greater detail below.

While the example embodiment illustrated includes electrical contacts 242 positioned on printed circuit board 244 having processing circuitry 45, in other embodiments, printed circuit board 244 having processing circuitry 45 is positioned elsewhere on housing 202 and electrical contacts 242 are disposed on electrical connector 240, e.g., on mount 246, in the positions illustrated and are connected to processing circuitry 45 by suitable traces, wires or the like.

Figure 12A:
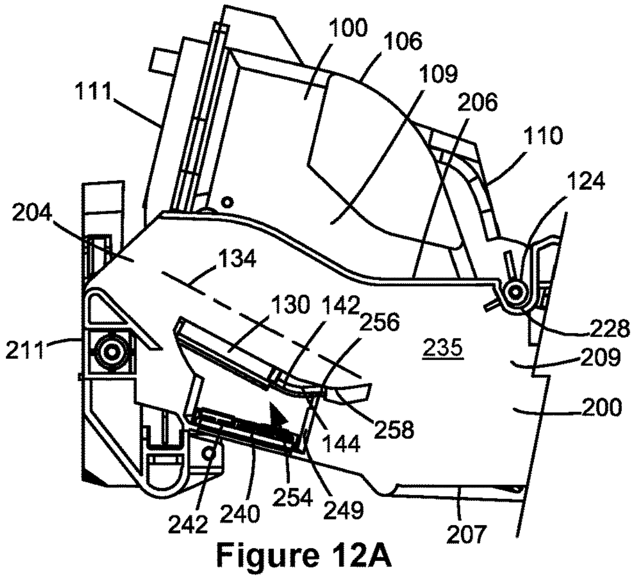
FIGS. 12A-12C are sequential side elevation views showing the actuation of the electrical connector of the toner cartridge from its retracted position to its operative position during installation of the toner cartridge onto the imaging unit according to one example embodiment.
Figure 12B:
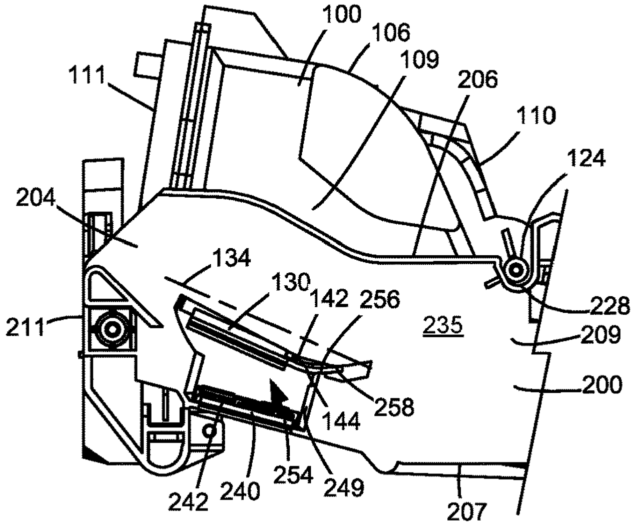
Figure 12C:
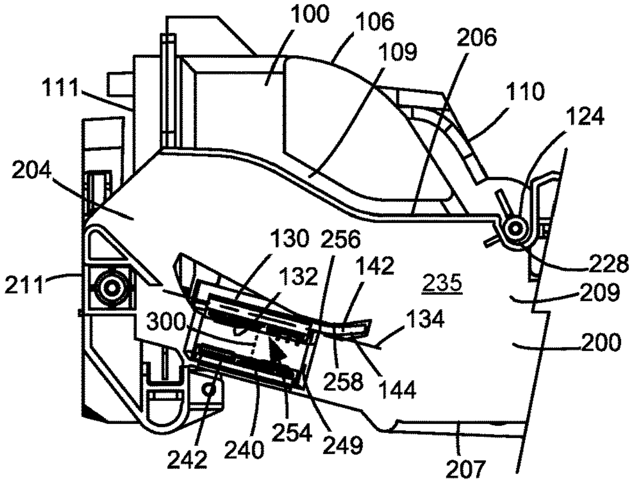

FIGS. 12A-12C are sequential views that show the actuation of electrical connector 130 of toner cartridge 100 from its retracted position to its operative position during the installation of toner cartridge 100 onto frame 204 of imaging unit 200. In the example embodiment illustrated, engagement between alignment guides 124 of toner cartridge 100 and guide rails 228 of imaging unit 200 controls the positioning of toner cartridge 100 relative to imaging unit 200 during installation of toner cartridge 100 onto frame 204 of imaging unit 200. In this embodiment, toner cartridge 100 pivots counterclockwise as viewed in FIGS. 12A-12C about a pivot axis that runs from alignment guide 124 on side 108 of housing 102 to alignment guide 124 on side 109 of housing 102 during installation of toner cartridge 100 onto frame 204 of imaging unit 200.

FIG. 12A shows toner cartridge 100 as it lowers into frame 204 of imaging unit 200 with electrical connector 130 of toner cartridge 100 in its retracted position as cam surface 144 of actuation member 142 of electrical connector 130 begins to contact cam surface 256 on front wall 249 of mount 246 of imaging unit 200. The contact between cam surface 144 of electrical connector 130 and cam surface 256 of imaging unit 200 as toner cartridge 100 lowers into frame 204 of imaging unit 200 overcomes the bias force applied to electrical connector 130 by biasing member 136 and causes electrical connector 130 to swing (out of the page as viewed in FIGS. 12A-12C) about pivot axis 134 from its retracted position toward its operative position. As toner cartridge 100 continues to lower into frame 204 of imaging unit 200, cam surface 144 of electrical connector 130 travels up the angled portion of cam surface 256 of imaging unit 200 causing electrical connector 130 to continue to pivot about pivot axis 134 from its retracted position toward its operative position. FIG. 12B shows electrical connector 130 of toner cartridge 100 in an intermediate position between the retracted position and the operative position as toner cartridge 100 lowers into frame 204 of imaging unit 200. When toner cartridge 100 reaches its final, installed position relative to imaging unit 200, contact between cam surface 144 of electrical connector 130 and cam surface 256 of imaging unit 200 holds electrical connector 130 of toner cartridge 100 in its operative position with electrical contacts 132 of electrical connector 130 facing downward.

FIG. 12C shows toner cartridge 100 fully installed on frame 204 of imaging unit 200 with electrical connector 130 in its operative position. When toner cartridge 100 is in its final position relative to imaging unit 200, electrical contacts 132 of toner cartridge 100 and electrical contacts 242 of imaging unit 200 are exposed to an exterior of imaging unit 200 through opening 254 in side wall 235 of frame 204 permitting an electrical connector in image forming device 22 to enter opening 254 and mate with electrical contacts 132 of toner cartridge 100 and electrical contacts 242 of imaging unit 200 when toner cartridge 100 and imaging unit 200 are installed in image forming device 22. In this embodiment, when toner cartridge 100 is in its final position relative to imaging unit 200 with electrical connector 130 of toner cartridge 100 in its operative position, electrical contacts 132 of toner cartridge 100 face downward and electrical contacts 242 of imaging unit 200 face upward such that electrical contacts 132 of toner cartridge 100 and electrical contacts 242 of imaging unit 200 face each other in a spaced relationship with a vertical gap 300 positioned between electrical contacts 132 of toner cartridge 100 and electrical contacts 242 of imaging unit 200.

Figure 13:
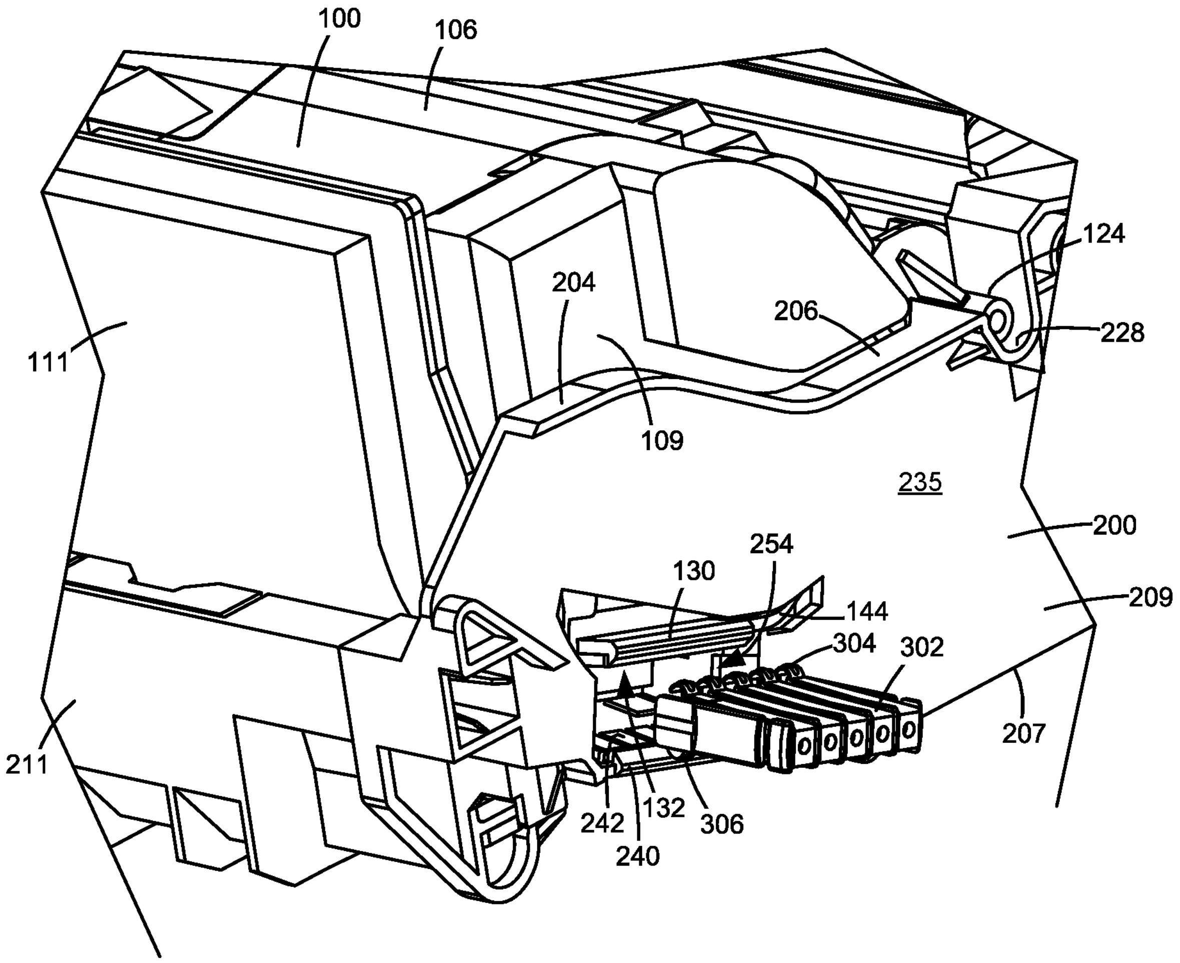
FIG. 13 is a perspective view of the toner cartridge installed on the imaging unit showing an electrical connector of the image forming device in a disengaged position according to one example embodiment.

FIG. 13 shows toner cartridge 100 installed on imaging unit 200 with toner cartridge 100 and imaging unit 200 installed in image forming device 22 and an electrical connector 302 of image forming device 22 positioned in a disengaged position relative to toner cartridge 100 and imaging unit 200. A frame of image forming device 22 that electrical connector 302 is mounted to and extends from is omitted in order to more clearly illustrate the positional relationship between electrical connector 302 and toner cartridge 100 and imaging unit 200. In this embodiment, electrical connector 302 is spaced outward sideways away from sides 109, 209 of toner cartridge 100 and imaging unit 200 when electrical connector 302 is in the disengaged position. Electrical connector 302 of image forming device 22 includes electrical contacts 304 on a top portion thereof and electrical contacts 306 on a bottom portion thereof. Electrical contacts 304 are positioned to contact electrical contacts 132 of toner cartridge 100 to facilitate communications link 51 between controller 28 of image forming device 22 and processing circuitry 44 of toner cartridge 100 when electrical connector 302 moves from the disengaged position to an engaged position after toner cartridge 100 and imaging unit 200 are installed in image forming device 22. Similarly, electrical contacts 306 are positioned to contact electrical contacts 242 of imaging unit 200 to facilitate communications link 52 between controller 28 of image forming device 22 and processing circuitry 45 of imaging unit 200 when electrical connector 302 moves from the disengaged position to the engaged position after toner cartridge 100 and imaging unit 200 are installed in image forming device 22. In one embodiment, electrical connector 302 is operatively connected to an access door of image forming device that permits user access to toner cartridge 100 and imaging unit 200 within image forming device 22 such that the closing of the access door moves electrical connector 302 from its disengaged position to its engaged position and the opening of the access door moves electrical connector 302 from its engaged position to its disengaged position. In other embodiments, a motor, solenoid or the like of the image forming device 22 selectively moves electrical connector 302 between the disengaged position and the engaged position.

Figure 14:
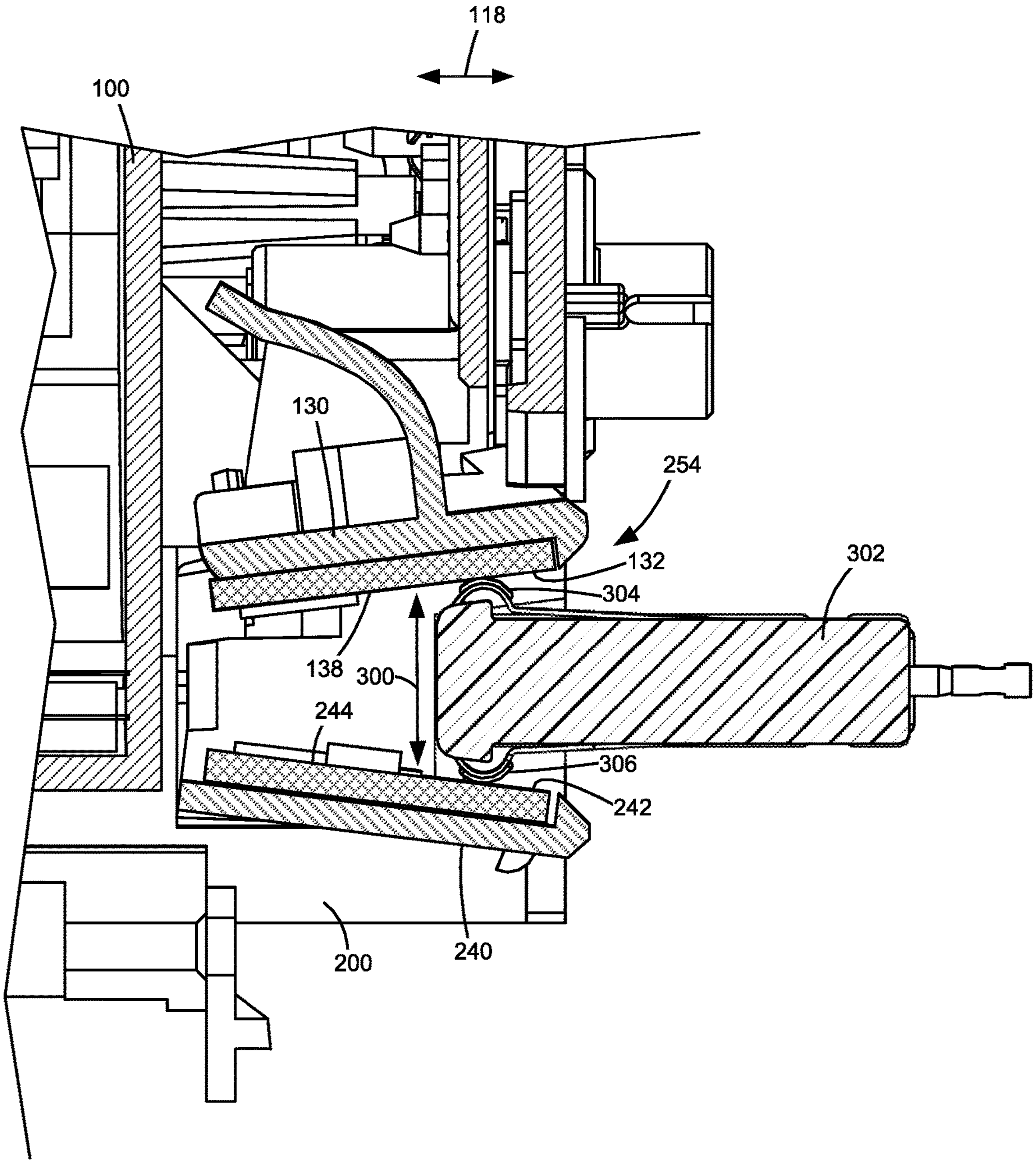
FIG. 14 is a cross-sectional view showing the electrical connector of the image forming device in an engaged position with the electrical connectors of the toner cartridge and imaging unit according to one example embodiment.

FIG. 14 shows toner cartridge 100 installed on imaging unit 200 with toner cartridge 100 and imaging unit 200 installed in image forming device 22 and electrical connector 302 of image forming device 22 positioned in an engaged position relative to toner cartridge 100 and imaging unit 200. Once again, the frame of image forming device 22 that electrical connector 302 is mounted to is omitted for clarity. After toner cartridge 100 and imaging unit 200 are mated with each other and installed in image forming device 22, electrical connector 302 moves from the disengaged position to the engaged position. In the embodiment illustrated, electrical connector 302 translates along side-to-side dimension 118 of housing 102 toward toner cartridge 100 and imaging unit 200 when electrical connector 302 moves from the disengaged position to the engaged position. As electrical connector 302 advances toward toner cartridge 100 and imaging unit 200, electrical connector 302 passes through opening 254 of frame 204 of imaging unit 200 and enters vertical gap 300 between electrical contacts 132 of toner cartridge 100 and electrical contacts 242 of imaging unit 200. In the embodiment illustrated, electrical contacts 304 and 306 of electrical connector 302 are configured to spring outward (clockwise and counterclockwise, respectively, as viewed in FIG. 14) into contact with electrical contacts 132 of toner cartridge 100 and electrical contacts 242 of imaging unit 200, respectively, as electrical connector 302 reaches the engaged position. Electrical contacts 304 and 306 of electrical connector 302 are also deflectable and sized to have an interference fit with electrical contacts 132 of toner cartridge 100 and electrical contacts 242 of imaging unit 200, respectively, when electrical connector 302 reaches the engaged position in order to maintain consistent, reliable electrical contact between electrical contacts 304 and 306 of electrical connector 302 and electrical contacts 132 of toner cartridge 100 and electrical contacts 242 of imaging unit 200.

Figure 15:
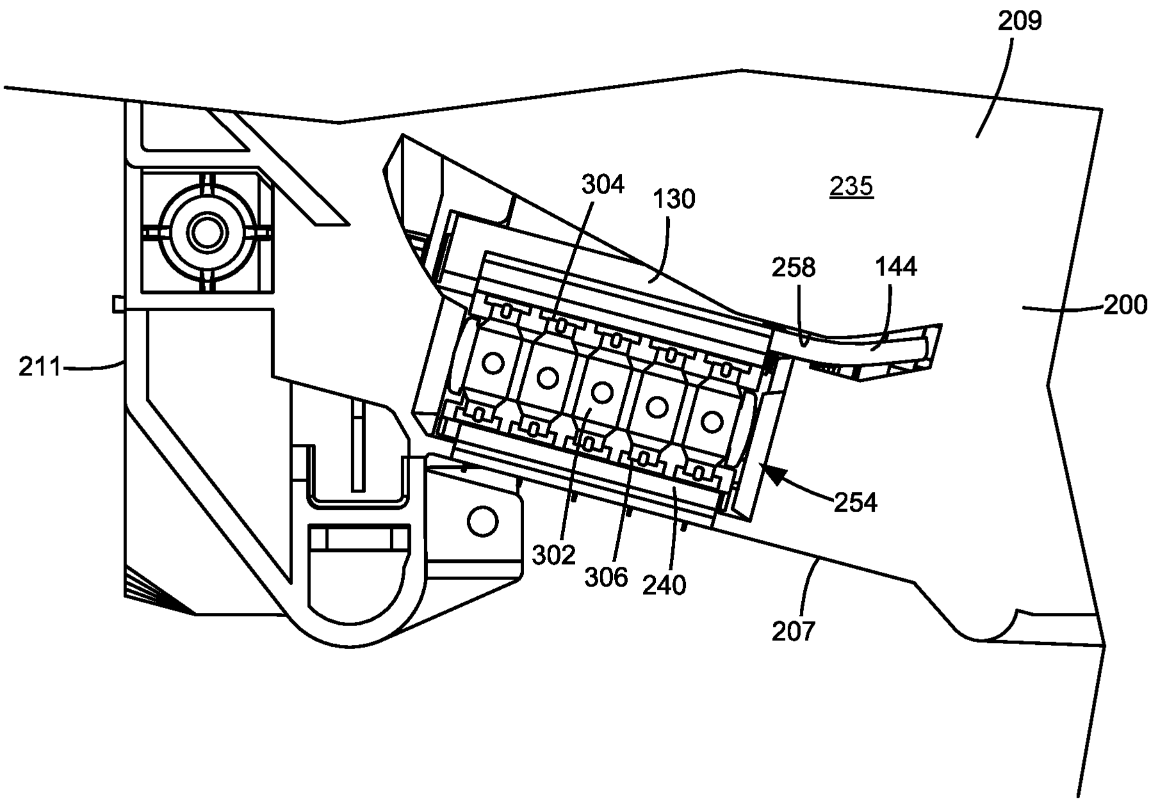
FIG. 15 is a side elevation view showing the electrical connector of the image forming device in the engaged position with the electrical connectors of the toner cartridge and imaging unit according to one example embodiment.

FIG. 15 shows electrical connector 302 in the engaged position passing through opening 254 of imaging unit 200 with electrical contacts 304 and 306 of electrical connector 302 in contact with electrical contacts 132 of toner cartridge 100 and electrical contacts 242 of imaging unit 200. In the embodiment illustrated, the upward force applied to electrical connector 130 of toner cartridge 100 by electrical contacts 304 of electrical connector 302 of image forming device 22 pushes an upper surface of electrical connector 130 against upstop 258 of imaging unit 200 in order to limit the upward movement of electrical connector 130. In this embodiment, the upward force applied to electrical contacts 132 of toner cartridge 100 by electrical contacts 304 of electrical connector 302 of image forming device 22 is equal and opposite to the downward force applied to electrical contacts 242 of imaging unit 200 by electrical contacts 306 of electrical connector 302 of image forming device 22. Contact between upstop 258 of imaging unit 200 and the upper surface of electrical connector 130 of toner cartridge 100 results in a downward reaction force on the upper surface of electrical connector 130 of toner cartridge 100 that aids in keeping most of the force from electrical connector 302 on imaging unit 200, which is firmly positioned in image forming device 22 after installation, instead of on toner cartridge 100. If, instead, upstop 258 of imaging unit 200 was omitted, the upward force on electrical connector 130 of toner cartridge 100 could tend to lift toner cartridge 100 upward relative to imaging unit 200, in turn, reducing the nip force between developer roll 120 and photoconductive drum 220, which could cause print defects.

When electrical connector 302 of image forming device 22 moves from the engaged position to the disengaged position, such as upon the opening of the access door of image forming device 22, the motion of electrical connector 302 is reversed such that electrical connector 302 passes out of opening 254 and moves away from toner cartridge 100 and imaging unit 200, returning to the position shown in FIG. 13. In the embodiment illustrated, electrical contacts 304 and 306 of electrical connector 302 return inward (counterclockwise and clockwise, respectively, as viewed in FIG. 14) as electrical connector 302 moves from the engaged position to the disengaged position.

Figure 16:
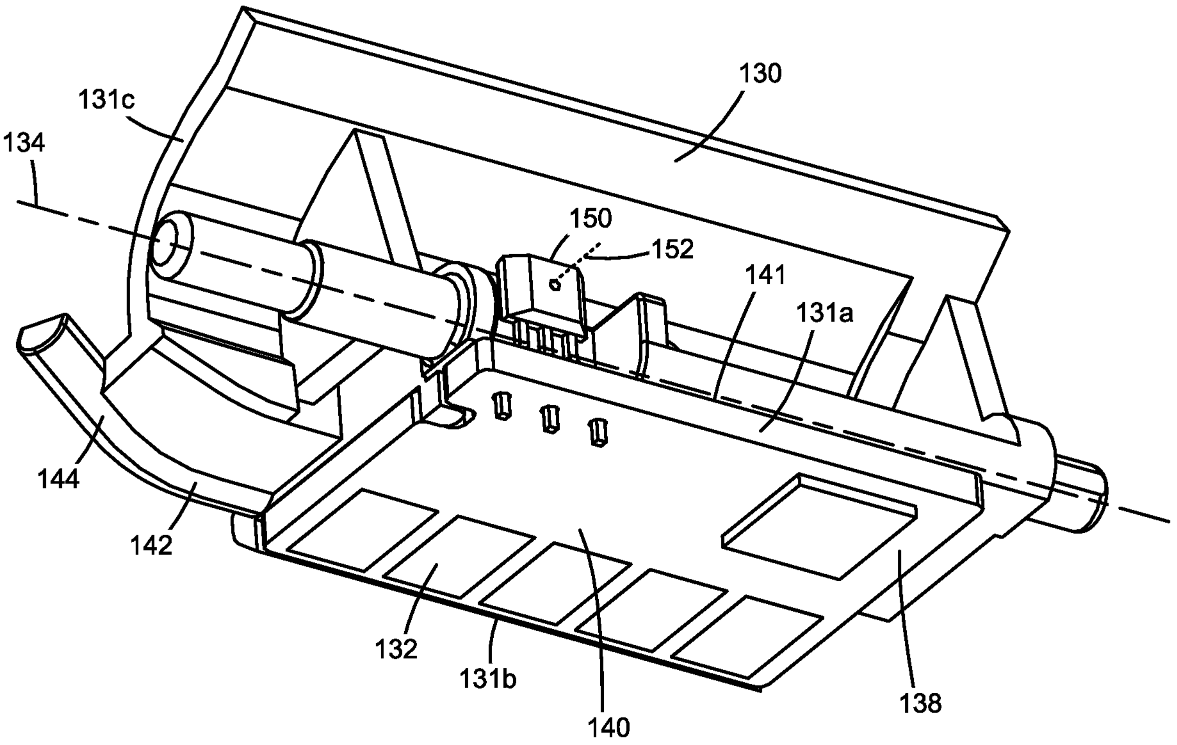
FIG. 16 is a perspective view of the electrical connector of the toner cartridge showing a magnetic sensor according to one example embodiment.

With reference to FIG. 16, in some embodiments, electrical connector 130 of toner cartridge 100 also includes a magnetic sensor 150 positioned on printed circuit board 138 for detecting one or more magnets movably positioned in reservoir 104 of toner cartridge 100. Magnetic sensor 150 may be any suitable device capable of detecting the presence or absence of a magnetic field. For example, magnetic sensor 150 may be a Hall-effect sensor, which is a transducer that varies its electrical output in response to a magnetic field. In the embodiment illustrated, magnetic sensor 150 is positioned on a face 141 of printed circuit board 138 that is opposite face 140 of printed circuit board 138 that includes electrical contacts 132. In this embodiment, magnetic sensor 150 is positioned along proximal end 131*a* of electrical connector 130, proximate to reservoir 104, e.g., in line with pivot axis 134 of electrical connector 130. In the embodiment illustrated, magnetic sensor 150 is positioned orthogonal to face 141 of printed circuit board 138 so that a sensing axis 152 of magnetic sensor 150 is oriented parallel to face 141 of printed circuit board 138. In this orientation, sensing axis 152 of magnetic sensor 150 is generally parallel to side-to-side dimension 118 of housing 102 when electrical connector 130 is in the operative position. In the embodiment illustrated, magnetic sensor 150 is electrically connected, e.g., via one or more traces on printed circuit board 138, to one of the electrical contacts 132 on printed circuit board 138 for transmitting an output of magnetic sensor 150 to controller 28 of image forming device 22 via communications link 51.

Figure 17A:
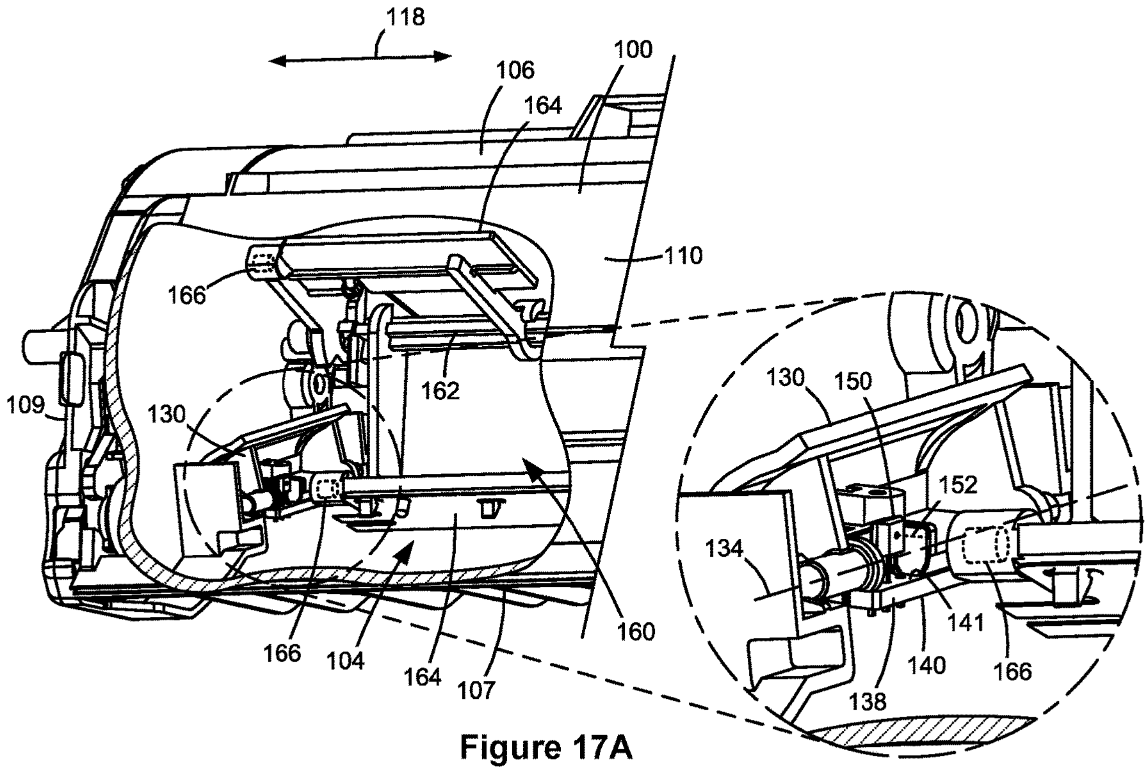
FIGS. 17A and 17B are perspective views of the toner cartridge showing a positional relationship between the magnetic sensor and a toner agitator assembly in a toner reservoir of the toner cartridge when the electrical connector of the toner cartridge is in the operative position and the retracted position, respectively, according to one example embodiment.
Figure 17B:
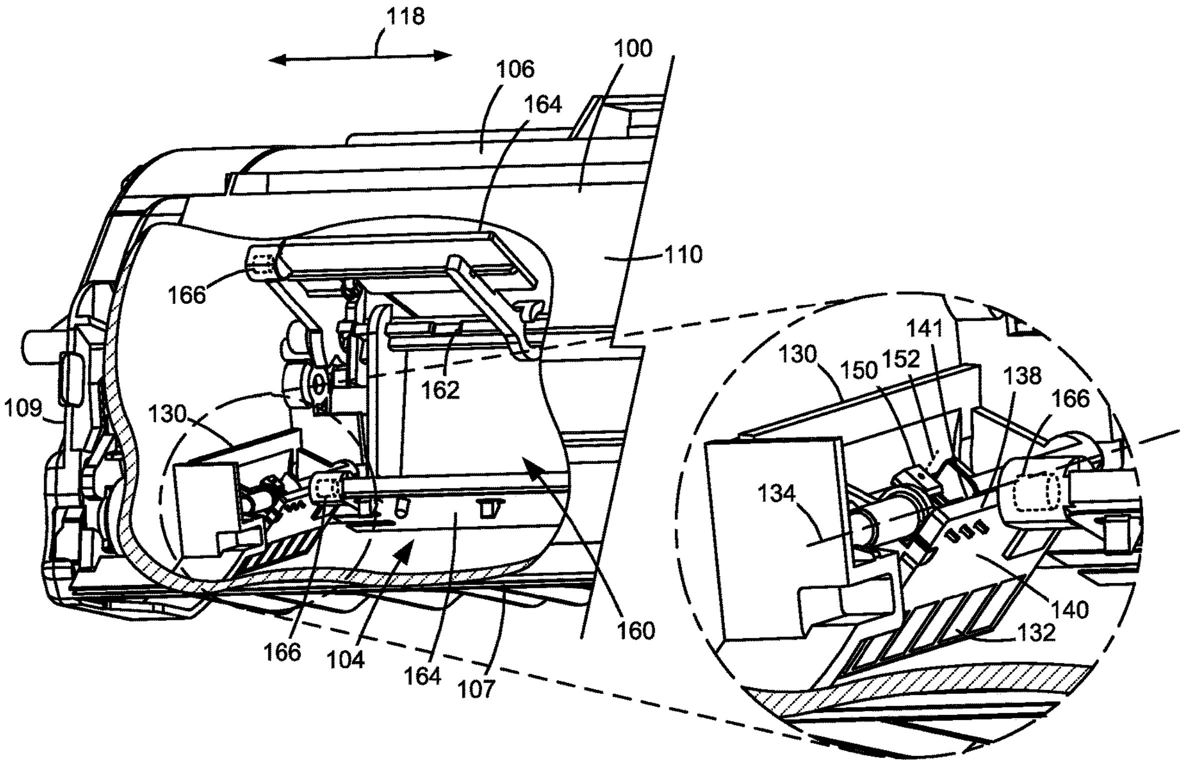

FIGS. 17A and 17B show toner cartridge 100 with a portion of front 110 of housing 102 omitted and with side wall 115 omitted in order to show the positional relationship between magnetic sensor 150 and various features in reservoir 104 according to one example embodiment. FIG. 17A shows electrical connector 130 in the operative position and FIG. 17B shows electrical connector 130 in the retracted position. In the example embodiment illustrated, toner cartridge 100 includes a toner agitator assembly 160 rotatably mounted in reservoir 104. Toner agitator assembly 160 includes a drive shaft 162 rotatably positioned in reservoir 104 that extends through aligned openings in side walls 114, 115, respectively. Drive shaft 162 is operatively connected to drive gear 126 to receive rotational force from drive gear 126. For example, a drive gear that mates (directly or indirectly by one or more intermediate gears) with drive gear 126 may be provided on an end of drive shaft 162.

Toner agitator assembly 160 includes one or more toner agitators 164 that extend outward from drive shaft 162 for mixing toner in reservoir 104 and for moving toner toward the toner adder roll of toner cartridge 100. Toner agitators 164 may take many different shapes and configurations depending on the architecture of toner cartridge 100 including, such as, for example, any suitable combination of one or more paddles, augers, rakes, combs, scoops, plows, arms, extensions, prongs, flaps, mixers, conveyors, screws, etc.

In the embodiment illustrated, toner agitator assembly 160 includes at least one permanent magnet 166 that moves within reservoir 104 in response to the rotation of drive shaft 162 and toner agitator assembly 160. In some embodiments, the movement of magnet(s) 166 during rotation of drive shaft 162 as sensed by magnetic sensor 150 provides an indication of the amount of toner present in reservoir 104. For example, magnet(s) may be positioned in one of the orientations described in U.S. Pat. No. 8,989,611, entitled "Replaceable Unit for an Image Forming Device Having a Falling Paddle for Toner Level Sensing," U.S. Pat. No. 9,389,582, entitled "Replaceable Unit for an Image Forming Device Having Magnets of Varying Angular Offset for Toner Level Sensing," or U.S. Pat. No. 9,519,243, entitled "Replaceable Unit for an Image Forming Device Having Magnets of Varying Angular Offset for Toner Level Sensing," all of which are assigned to the assignee of the present application. In other embodiments, magnet(s) 166 may provide an indication of one or more characteristics of toner cartridge 100, such as, for example, toner cartridge type, toner color, toner capacity, geographic region of manufacture or use, etc. In the embodiment illustrated, magnet(s) 166 are positioned at an axial end of reservoir 104 proximate to side wall 115.

As shown in FIG. 17A, when electrical connector 130 of toner cartridge 100 is in the operative position, sensing axis 152 of magnetic sensor 150 is generally parallel to side-to-side dimension 118 of housing 102 and to drive shaft 162 such that magnetic sensor 150 is oriented to detect the magnetic field(s) of magnet(s) 166 through side wall 115 as magnet(s) 166 pass magnetic sensor 150. As shown in FIG. 17B, when electrical connector 130 of toner cartridge 100 is in the retracted position, magnetic sensor 150 is angled upward relative to side-to-side dimension 118 of housing 102 and to drive shaft 162. As a result, in some embodiments, magnetic sensor 150 is out of alignment with magnet (s) 166 when electrical connector 130 is in the retracted position and may not sense magnet(s) 166 as magnet(s) 166 pass magnetic sensor 150. Accordingly, in the embodiment illustrated, the movement of electrical connector 130 of toner cartridge 100 from the retracted position to the operative position upon the installation of toner cartridge 100 on imaging unit 200 moves magnetic sensor 150 from a misaligned position relative to magnet(s) 166 to an aligned position relative to magnet(s) 166.

It will be appreciated that the configuration of electrical connector 130 of toner cartridge 100 including the motion of electrical connector 130 between the retracted position and the operative position is not limited to the example embodiment illustrated. For example, the embodiment illustrated includes an electrical connector 130 that pivots between the retracted position and the operative position about a fixed pivot axis 134. However, in other embodiments, the location of the pivot axis of the electrical connector of the toner cartridge moves relative to the housing of the toner cartridge as the electrical connector of the toner cartridge pivots between the retracted position and the operative position.

Further, the embodiment illustrated includes a rigid electrical connector 130 including electrical contacts 132 positioned on a rigid printed circuit board 138. However, in other embodiments, the electrical contacts of the electrical connector of the toner cartridge are flexible relative to the housing of the toner cartridge permitting the electrical contacts to flex between the retracted position and the operative position. For example, the electrical contacts of the electrical connector of the toner cartridge may be formed on a flexible printed circuit board or the electrical contacts may be electrically connected to a printed circuit board mounted elsewhere on the housing of the toner cartridge and positioned on or connected to a flexible substrate other than the printed circuit board.

Figure 18:
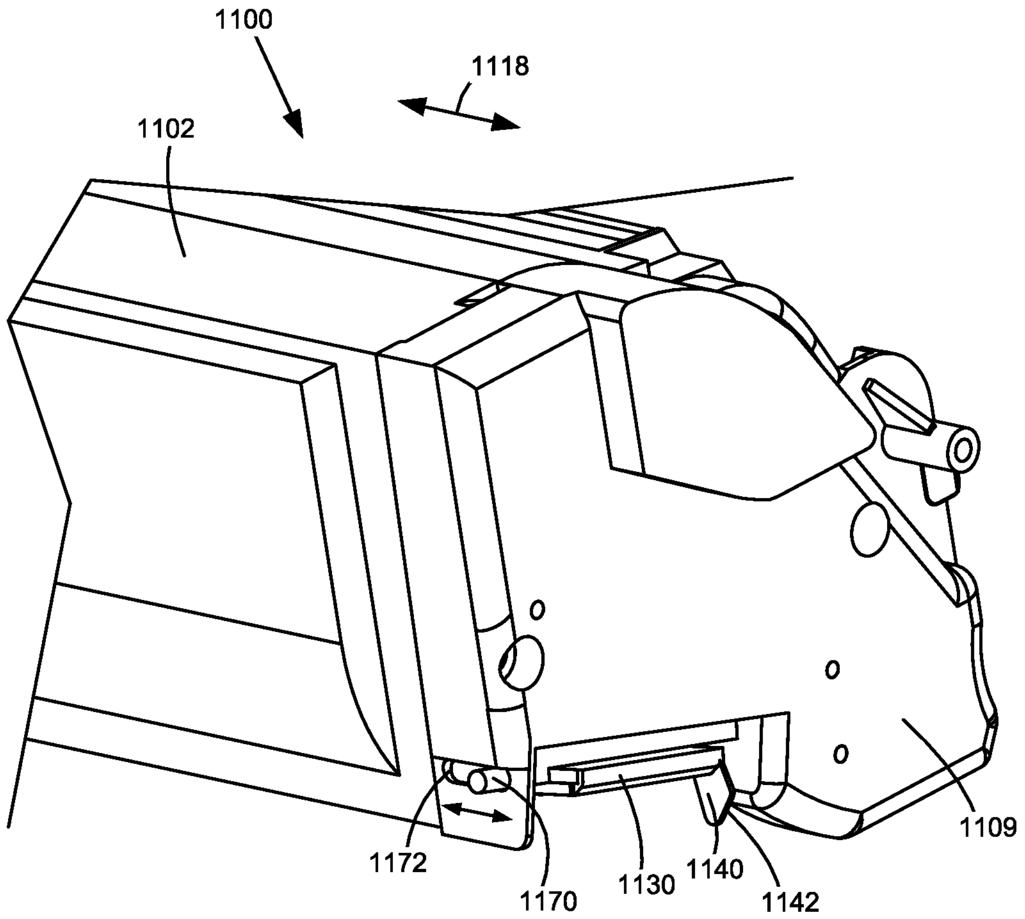
FIG. 18 is a perspective view of a toner cartridge having an electrical connector according to another example embodiment.

Further, while the embodiment illustrated includes an electrical connector 130 of toner cartridge 100 that pivots between the retracted position and the operative position, it will be appreciated that the electrical connector of the toner cartridge may move in other manners relative to the housing of the toner cartridge between the retracted position and the operative position, such as, for example, translating between the retracted position and the operative position. For example, FIG. 18 shows a toner cartridge 1100 having an electrical connector 1130 positioned on a side 1109 of a housing 1102. Electrical connector 1130 translates outward sideways (away from side 1109) as electrical connector 1130 travels from the retracted position to the operative position and inward sideways (toward side 1109) as electrical connector 1130 travels from the operative position to the retracted position. In the embodiment illustrated, electrical connector 1130 translates parallel to a side-to-side dimension 1118 of housing 1102. In other embodiments, electrical connector 1130 translates at an angle to side-to-side dimension 1118 of housing 1102, e.g., upward, downward, rearward and/or frontward. In the example embodiment illustrated, the movement of electrical connector 1130 between the retracted position and the operative position is controlled by engagement between a post 1170 extending from electrical connector 1130 and an elongated slot 1172 on housing 1102. However, this configuration may be reversed or other configurations may be used as desired. In the example embodiment illustrated, electrical connector 1130 includes an actuation member 1142 having a cam surface 1144 that contacts a corresponding actuation member on the imaging unit during the installation of toner cartridge 1100 onto the imaging unit to move electrical connector 130 from the retracted position to the operative position.

It will also be appreciated that imaging unit 200 may include one or more actuation or cam features modified relative to cam surface 256 of the example embodiment illustrated as desired in order to actuate the electrical connector of the toner cartridge from the retracted position to the operative position during installation of the toner cartridge onto the imaging unit. Alternatively, the electrical connector of the toner cartridge may be actuated by other means, such as, for example, by a linkage actuated by the opening and closing of the access door of the image forming device or by a user-actuated mechanism.

While the example embodiment illustrated includes a magnetic sensor 150 positioned on an electrical connector 130 that moves between a retracted position and an operative position, in other embodiments including a magnetic sensor, either or both of magnetic sensor 150 and electrical contact(s) 132 may be fixedly positioned on housing 102 of toner cartridge 100 as desired.

While the example embodiment illustrated includes toner cartridge 100 having a movable electrical connector 130 and imaging unit 200 having an actuation member that moves electrical connector 130 from its retracted position to its operative position during installation of toner cartridge 100 onto imaging unit 200, this configuration may be reversed as desired such that the imaging unit includes a movable electrical connector and the toner cartridge includes an actuation member that moves the electrical connector from a retracted position to an operative position during mating of the toner cartridge with the imaging unit.

Although the example embodiment discussed above includes a pair of replaceable units in the form of a toner cartridge 100 that includes the main toner supply for the image forming device and the developer unit and an imaging unit 200 that includes the photoconductor unit for each toner color, it will be appreciated that the replaceable unit(s) of the image forming device may employ any suitable configuration as desired. For example, in one embodiment, the main toner supply for the image forming device is provided in a first replaceable unit and the developer unit and photoconductor unit are provided in a second replaceable unit. In another embodiment, the main toner supply for the image forming device, the developer unit and the photoconductor unit are provided in a single replaceable unit. Other configurations may be used as desired.

Further, it will be appreciated that the architecture and shape of toner cartridge 100 and imaging unit 200 illustrated in FIGS. 2-6 is merely intended to serve as an example. Those skilled in the art understand that toner cartridges, and other toner containers, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A replaceable unit for an electrophotographic image forming device, comprising:

a housing having a top, a bottom, a front and a rear positioned between a first side and a second side of the housing, the housing has a reservoir for holding toner;

a developer roll rotatably positioned on the housing, a portion of an outer surface of the developer roll is exposed along the front of the housing for supplying toner from the reservoir to a corresponding photoconductive drum;

an electrical connector on the first side of the housing, the electrical connector includes an electrical contact for contacting a corresponding electrical contact in the image forming device, the electrical contact of the replaceable unit is electrically connected to processing circuitry mounted on the replaceable unit, the electrical connector is movable between a first position and a second position, the electrical contact of the replaceable unit moves outward from the first side of the housing along a side-to-side dimension of the housing when the electrical connector moves from the first position to the second position such that the electrical contact of the replaceable unit is positioned further outward along the side-to-side dimension of the housing when the electrical connector is in the second position than when the electrical connector is in the first position, the electrical contact of the replaceable unit faces downward and is unobstructed from below when the electrical connector is in the second position permitting the corresponding electrical contact in the image forming device to contact the electrical contact of the replaceable unit from below; and an interface gear on the second side of the housing, at least a portion of the interface gear is exposed on the front of the housing for mating with a corresponding drive gear and receiving rotational force from the corresponding drive gear.

2. The replaceable unit of claim 1, wherein the electrical connector is pivotable about a pivot axis between the first position and the second position, the electrical contact of the replaceable unit pivots outward from the first side of the housing when the electrical connector pivots from the first position to the second position.

3. The replaceable unit of claim 2, wherein a position of the pivot axis is fixed relative to the housing.

4. The replaceable unit of claim 2, wherein the pivot axis extends in a direction from the rear of the housing to the front of the housing and angles downward in the direction from the rear of the housing to the front of the housing.

5. The replaceable unit of claim 2, wherein the electrical contact of the replaceable unit pivots upward when the electrical connector pivots from the first position to the second position.

6. The replaceable unit of claim 1, further comprising a biasing member that biases the electrical connector toward the first position.

7. The replaceable unit of claim 1, wherein when the electrical connector is in the second position, the electrical contact of the replaceable unit is positioned closer to the bottom of the housing than to the top of the housing and the electrical contact of the replaceable unit is positioned closer to the rear of the housing than to the front of the housing.

8. The replaceable unit of claim 1, wherein the electrical contact of the replaceable unit faces inward toward the first side of the housing when the electrical connector is in the first position.

9. The replaceable unit of claim 1, wherein the electrical connector includes a printed circuit board that includes the processing circuitry, the electrical contact of the replaceable unit is positioned on a face of the printed circuit board, the face of the printed circuit board faces downward when the electrical connector is in the second position and the face of the printed circuit board faces inward toward the first side of the housing when the electrical connector is in the first position.

10. The replaceable unit of claim 1, wherein the electrical connector includes a cam surface that is positioned along a distal end of the electrical connector relative to the first side of the housing for contacting an actuation member during installation of the replaceable unit to move the electrical connector from the first position to the second position.

11. The replaceable unit of claim 10, wherein the cam surface extends toward the front of the housing from a front portion of the electrical connector, a bottom portion of the cam surface faces downward when the electrical connector is in the second position, the bottom portion of the cam surface angles upward in a direction from the rear of the housing to the front of the housing when the electrical connector is in the second position.

12. The replaceable unit of claim 10, wherein the cam surface extends toward the front of the housing from a front portion of the electrical connector, an outer side portion of the cam surface faces outward away from the first side of the housing when the electrical connector is in the second position, the outer side portion of the cam surface angles inward toward the first side of the housing in a direction from the rear of the housing to the front of the housing when the electrical connector is in the second position.

13. A replaceable unit for an electrophotographic image forming device, comprising:

a housing having a top, a bottom, a front and a rear positioned between a first side and a second side of the housing, the housing has a reservoir for holding toner; and a printed circuit board on the first side of the housing, the printed circuit board includes an electrical contact positioned on a face of the printed circuit board for contacting a corresponding electrical contact in the image forming device, the printed circuit board includes processing circuitry electrically connected to the electrical contact of the replaceable unit, the printed circuit board is pivotable about a pivot axis between a first position and a second position, the printed circuit board pivots upward and outward from the first side of the housing when the printed circuit board moves from the first position to the second position, the face of the printed circuit board faces inward toward the first side of the housing when the printed circuit board is in the first position, the face of the printed circuit board faces downward and the electrical contact of the printed circuit board is unobstructed from below when the printed circuit board is in the second position permitting the corresponding electrical contact in the image forming device to contact the electrical contact of the replaceable unit from below.

14. The replaceable unit of claim 13, wherein a position of the pivot axis is fixed relative to the housing.

15. The replaceable unit of claim 13, wherein the pivot axis extends in a direction from the rear of the housing to the front of the housing and angles downward in the direction from the rear of the housing to the front of the housing.

16. The replaceable unit of claim 13, further comprising a developer roll rotatably positioned on the housing, a portion of an outer surface of the developer roll is exposed along the front of the housing for supplying toner from the reservoir to a corresponding photoconductive drum.

17. The replaceable unit of claim 13, further comprising an interface gear on the second side of the housing, at least a portion of the interface gear is exposed on the front of the housing for mating with a corresponding drive gear and receiving rotational force from the corresponding drive gear.

18. The replaceable unit of claim 13, further comprising a biasing member that biases the printed circuit board toward the first position.

19. The replaceable unit of claim 13, wherein when the printed circuit board is in the second position, the electrical contact of the replaceable unit is positioned closer to the bottom of the housing than to the top of the housing and the electrical contact of the replaceable unit is positioned closer to the rear of the housing than to the front of the housing.

* * * * *